United States Patent
Park et al.

(10) Patent No.: US 9,355,773 B2
(45) Date of Patent: May 31, 2016

(54) APPARATUS AND METHOD FOR SHIELDING LEAKAGE MAGNETIC FIELD IN WIRELESS POWER TRANSMISSION SYSTEM

(71) Applicant: Samsung Electronics Co., Ltd., Suwon-si (KR)

(72) Inventors: Jae Hyun Park, Pyeongtaek-si (KR); Young Ho Ryu, Yongin-si (KR); Sang Wook Kwon, Seongnam-si (KR); Ki Young Kim, Yongin-si (KR); Yun Kwon Park, Dongducheon-si (KR); Keum Su Song, Seoul (KR); Chi Hyung Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 13/957,950

(22) Filed: Aug. 2, 2013

(65) Prior Publication Data

US 2014/0042820 A1 Feb. 13, 2014

(30) Foreign Application Priority Data

Aug. 7, 2012 (KR) .......................... 10-2012-0086301

(51) Int. Cl.
| | |
|---|---|
| H01F 27/42 | (2006.01) |
| H01F 27/38 | (2006.01) |
| H01F 38/14 | (2006.01) |
| H01F 27/34 | (2006.01) |
| B60L 11/18 | (2006.01) |

(52) U.S. Cl.
CPC .............. *H01F 38/14* (2013.01); *H01F 27/346* (2013.01); *H01F 27/38* (2013.01); *B60L 11/182* (2013.01); *B60L 11/1846* (2013.01)

(58) Field of Classification Search
CPC ....... H01F 38/14; H01F 27/346; H01F 27/38; B60L 11/182; B60L 11/1846
USPC ........................................................ 307/104
See application file for complete search history.

(56) References Cited

U.S. PATENT DOCUMENTS

| | | | | |
|---|---|---|---|---|
| 4,806,894 A | * | 2/1989 | Koto ...................... | H01F 27/38 335/214 |
| 9,130,408 B2 | * | 9/2015 | Ichikawa .............. | B60L 11/182 |

FOREIGN PATENT DOCUMENTS

| | | |
|---|---|---|
| JP | 2010-98807 A | 4/2010 |
| JP | 2011-45189 A | 3/2011 |
| JP | 2011-135754 A | 7/2011 |
| JP | 2011-147213 A | 7/2011 |
| JP | 2011-234496 A | 11/2011 |
| KR | 10-1045585 B1 | 6/2011 |

* cited by examiner

*Primary Examiner* — Hal Kaplan
(74) *Attorney, Agent, or Firm* — NSIP Law

(57) ABSTRACT

A leakage magnetic field shielding apparatus includes a resonator configured to counterbalance a leakage magnetic field generated when a source resonator and a target resonator resonate at a resonant frequency of the source resonator and the target resonator.

27 Claims, 23 Drawing Sheets

Case 1

Case 2

APPARATUS AND METHOD FOR SHIELDING LEAKAGE MAGNETIC FIELD IN WIRELESS POWER TRANSMISSION SYSTEM

CROSS-REFERENCE TO RELATED APPLICATIONS

This application claims the benefit under 35 USC 119(a) of Korean Patent Application No. 10-2012-0086301 filed on Aug. 7, 2012, in the Korean Intellectual Property Office, the disclosure of which is incorporated herein by reference in its entirety for all purposes.

BACKGROUND

1. Field

The following description relates to an apparatus and method for shielding a leakage magnetic field generated during wireless power transmission.

2. Description of Related Art

Wireless power refers to energy that is transferred from a wireless power transmitter to a wireless power receiver through magnetic coupling. Accordingly, a wireless power transmission system includes a source device configured to wirelessly transmit power, and a target device configured to wirelessly receive power. The source device may be referred to as a wireless power transmitter, and the target device may be referred to as a wireless power receiver.

The source device includes a source resonator, and the target device includes a target resonator. Magnetic coupling or resonance coupling occurs between the source resonator and the target resonator.

Since the source device generates a magnetic field in all directions to wirelessly transmit power, any portion of the magnetic field that is not used for wireless power transmission will be a leakage magnetic field.

SUMMARY

In one general aspect, a leakage magnetic field shielding apparatus includes a resonator configured to counterbalance a leakage magnetic field generated when a source resonator and a target resonator resonate at a resonant frequency of the source resonator and the target resonator.

The leakage magnetic field may cause the resonator to generate a counterbalance magnetic field at a resonant frequency set to counterbalance the leakage magnetic field.

The leakage magnetic field may excite a current in the resonator; the current in the resonator may generate a counterbalance magnetic field at a resonant frequency set to counterbalance the leakage magnetic field; and the counterbalance magnetic field may have an intensity that is equal to an intensity of the leakage magnetic field.

The leakage magnetic field may excite a current in the resonator; the current in the resonator may generate a counterbalance magnetic field at a resonant frequency set to counterbalance the leakage magnetic field; and the counterbalance magnetic field may have a phase that is opposite to a phase of the leakage magnetic field.

The resonator may include a loop circuit configured to generate a counterbalance magnetic field having an intensity that is equal to an intensity of the leakage magnetic field, and a phase that is opposite to a phase of the leakage magnetic field.

The leakage magnetic field shielding apparatus may further include at least one additional resonator configured to counterbalance the leakage magnetic field generated when the source resonator and the target resonator resonate at the resonant frequency; and a total number of resonators of the leakage magnetic shielding apparatus depends on an intensity and a phase of the leakage magnetic field.

In another general aspect, a leakage magnetic field shielding apparatus includes a power supply unit configured to supply power to be used to counterbalance a leakage magnetic field generated when a source resonator and a target resonator resonate at a resonant frequency of the source resonator and the target resonator; and a counterbalance magnetic field generator configured to generate a counterbalance magnetic field at a resonant frequency set to counterbalance the leakage magnetic field using the power supplied by the power supply unit.

The power supply unit may be further configured to control a magnitude of the power supplied by the power supply unit based on an intensity of the leakage magnetic field.

The power supply unit may be further configured to control a phase of the power supplied by the power supply unit based on a phase of the leakage magnetic field.

The power supply unit may include a power source configured to supply power; and a capacitor configured to generate power in response to the leakage magnetic field.

In another general aspect, a wireless power transmission system includes a source resonator configured to generate a power transmission magnetic field and a leakage magnetic field at a resonant frequency of the source resonator; a target resonator configured to generate power in response to the power transmission magnetic field, the target resonator having a resonant frequency that is equal to the resonant frequency of the source resonator; and a leakage magnetic field shielding apparatus configured to generate a counterbalance magnetic field to counterbalance the leakage magnetic field.

The leakage magnetic field shielding apparatus may include a resonator configured to generate the counterbalance magnetic field at a resonant frequency set to counterbalance the leakage magnetic field in response to the leakage magnetic field.

The leakage magnetic field may cause the resonator to generate the counterbalance magnetic field at the resonant frequency set to counterbalance the leakage magnetic field.

The leakage magnetic field shielding apparatus may include a power supply unit configured to supply power to be used to counterbalance the leakage magnetic field; and a counterbalance magnetic field generator configured to generate the counterbalance magnetic field at a resonant frequency set to counterbalance the leakage magnetic field using the power supplied by the power supply unit.

A location and an angle at which the leakage magnetic field shielding apparatus is installed may be determined based on an intensity and a direction of the leakage magnetic field.

In another general aspect, a leakage magnetic field shielding method includes generating a counterbalance magnetic field to counterbalance a leakage magnetic field generated when a source resonator and a target resonator resonate at a resonant frequency of the source resonator and the target resonator.

The generating may include generating the counterbalance magnetic field with a resonator having a resonant frequency set to counterbalance the leakage magnetic field; the leakage magnetic field may excite a current in the resonator; and the current in the resonator may generate the counterbalance magnetic field at the resonant frequency set to counterbalance the leakage magnetic field so that an intensity of the counterbalance magnetic field is equal to an intensity of the leakage magnetic field.

The generating may include generating the counterbalance magnetic field with a resonator having a resonant frequency set to counterbalance the leakage magnetic field; the leakage magnetic field may excite a current in the resonator; and the current in the resonator may generate the counterbalance magnetic field at the resonant frequency set to counterbalance the leakage magnetic field so that a phase of the counterbalance magnetic field is opposite to a phase of the leakage magnetic field.

In another general aspect, a leakage magnetic field shielding method includes supplying power to be used to counterbalance a leakage magnetic field generated when a source resonator and a target resonator resonate at a resonant frequency of the source resonator and the target resonator; and generating a counterbalance magnetic field at a resonant frequency set to counterbalance the leakage magnetic field using the supplied power.

The supplying may include controlling a magnitude of the supplied power based on an intensity of the leakage magnetic field.

The supplying may include controlling a phase of the supplied power based on a phase of the leakage magnetic field.

In another general aspect, a leakage magnetic field shielding apparatus includes a device configured to generate a counterbalance magnetic field to counterbalance a leakage magnetic field generated during wireless power transmission.

The leakage magnetic field may be generated when a source resonator resonates with a target resonator at a resonant frequency of the source resonator and the target resonator to wirelessly transmit power from the source resonator to the target resonator; and the device may include a resonator configured to generate the counterbalance magnetic field at a resonant frequency set to counterbalance the leakage magnetic field.

The resonator may include a capacitor, and a loop circuit connected to the capacitor; the leakage magnetic field may excite a current in the resonator at the resonant frequency set to counterbalance the leakage magnetic field; and the current in the resonator may generate the counterbalance magnetic field at the resonant frequency set to counterbalance the leakage magnetic field.

A capacitance of the capacitor and an inductance of the loop circuit may have values that cause the current in the resonator to have a magnitude and a phase that cause the counterbalance magnetic field to have an intensity that is equal to an intensity of the leakage magnetic field, and a phase that is opposite to a phase of the leakage magnetic field, so that the counterbalance magnetic field counterbalances the leakage magnetic field.

The resonator may include a power supply unit configured to supply power; and a loop circuit connected to the power supply and configured to generate the counterbalance magnetic field at the resonant frequency set to counterbalance the leakage magnetic field using the power supplied by the power supply unit.

The power supply may be further configured to control a magnitude and a phase of the power supplied by the power supply unit so that the counterbalance magnetic field generated by the loop circuit using the power supplied by the power supply unit has an intensity that is equal to an intensity of the leakage magnetic field, and a phase that is opposite to a phase of the leakage magnetic field, so that the counterbalance magnetic field counterbalances the leakage magnetic field.

Other features and aspects will be apparent from the following detailed description, the drawings, and the claims.

DETAILED DESCRIPTION

Figure 1:
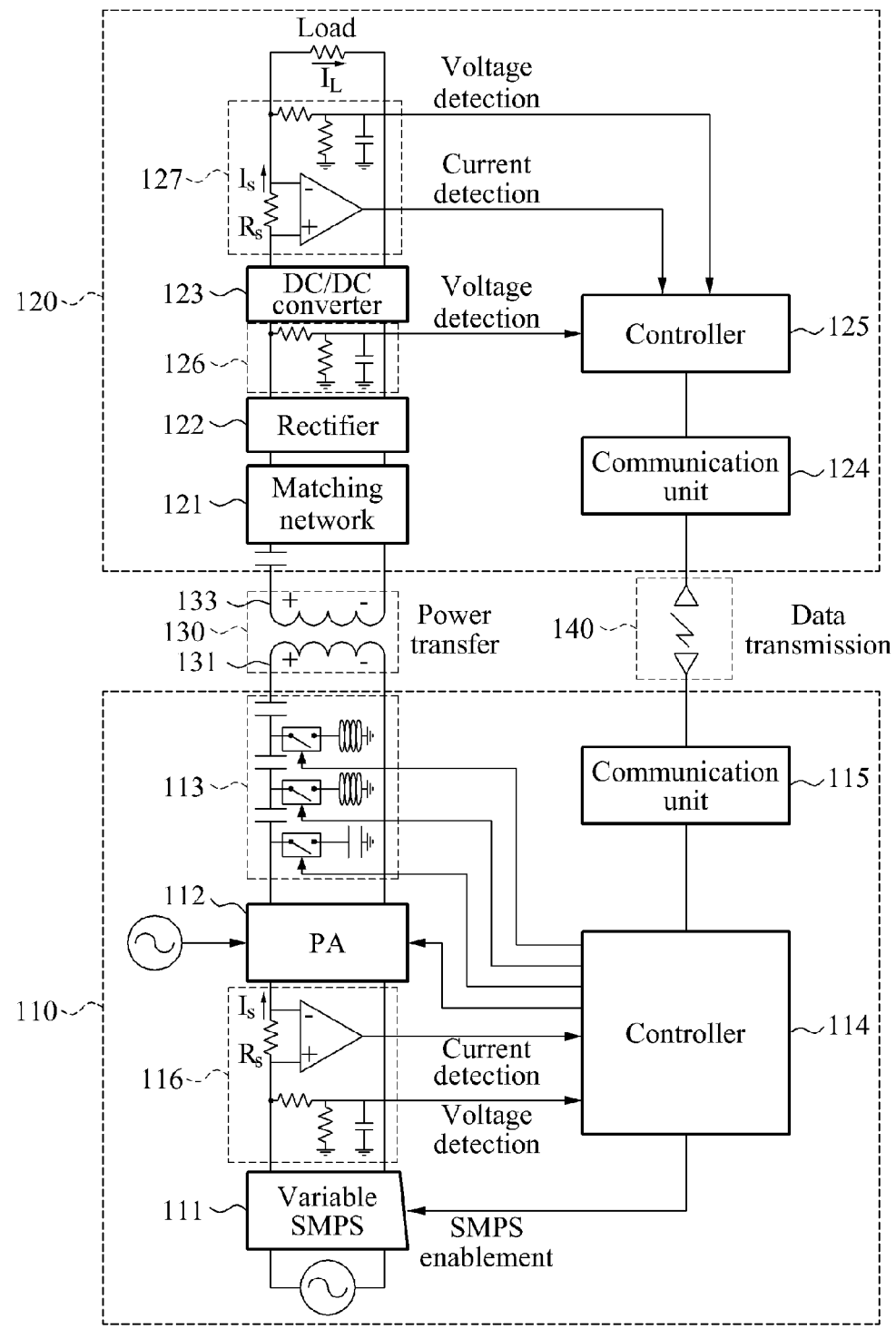
FIG. 1 is a diagram illustrating an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

A scheme of performing communication between a source and a target may be an in-band communication scheme, or an out-band communication scheme, or a combination of both. The in-band communication scheme refers to communication performed between the source and the target in the same frequency band that is used for power transmission. The out-band communication scheme refers to communication performed between the source and the target in a frequency band that is different from a frequency band used for power transmission.

FIG. 1 is a diagram illustrating an example of a wireless power transmission system. Referring to FIG. 1, the wireless power transmission system includes a source device 110 and a target device 120. The source device 110 is a device configured to supply wireless power, and includes all electronic devices capable of supplying power, such as, for example, a pad, a terminal, and a television (TV). The target device 120 is a device configured to receive wireless power, and includes all electronic devices requiring power, such as, for example, a terminal, a TV, a vehicle, a washing machine, a radio, and an electric light.

The source device 110 includes a variable switching mode power supply (SMPS) 111, a power amplifier (PA) 112, a matching network 113, a controller 114, a communication unit 115, and a power detector 116.

The variable SMPS 111 generates a direct current (DC) voltage from an alternating current (AC) voltage having a frequency of tens of hertz (Hz) output from a power supply. The variable SMPS 111 may output a DC voltage having a predetermined level, or may output a DC voltage having an adjustable level under the control of the controller 114.

The power detector 116 detects an output current and an output voltage of the variable SMPS 111, and provides, to the controller 114, information on the detected current and the detected voltage. Additionally, the power detector 116 detects an input current and an input voltage of the power amplifier 112.

The power amplifier 112 generates power by converting a DC voltage having a predetermined level to an AC voltage using a switching pulse signal in a band of a few kilohertz (kHz) to tens of MHz. Accordingly, the power amplifier 112 converts a DC voltage supplied to the power amplifier 112 to an AC voltage having a reference resonant frequency $F_{Ref}$, and generates communication power used for communication, or charging power used for charging, or both. The communication power and the charging power may be used in a plurality of target devices.

The communication power may be a low power of 0.1 milliwatt (mW) to 1 mW. The charging power may be a high power of 1 mW to 200 W that is consumed by a device load of a target device. In various examples described herein, the term "charging" may refer to supplying power to a unit or element that is configured to charge a battery or other rechargeable device with power. Additionally, the term "charging" may refer to supplying power to a unit or element that is configured to consume power. The units or elements may include, for example, batteries, displays, sound output circuits, main processors, and various sensors.

Also, the term "reference resonant frequency" refers to a resonant frequency that is nominally used by the source device 110, and the term "tracking frequency" refers to a resonant frequency used by the source device that has been adjusted based on a preset scheme.

The controller 114 detects a reflected wave of the communication power or the charging power, and detects mismatching that occurs between a target resonator 133 and a source resonator 131 based on the detected reflected wave. To detect the mismatching, for example, the controller 114 may detect an envelope of the reflected wave, a power amount of the reflected wave, or any other parameter of the reflected wave.

The matching network 113 compensates for impedance mismatching between the source resonator 131 and the target resonator 133 to achieve optimal matching under the control of the controller 114. The matching network 113 includes a plurality of switches each connected to a capacitor or an inductor, and the switches are controlled by the controller 114 to achieve optimal matching.

The controller 114 calculates a voltage standing wave ratio (VSWR) based on a voltage level of the reflected wave and a level of an output voltage of the source resonator 131 or the power amplifier 112. For example, when the VSWR is greater than a predetermined value, the controller 114 detects that there is mismatching between the source resonator 131 and the target resonator 133.

In this example, the controller 114 computes a power transmission efficiency for each of N tracking frequencies, determines a tracking frequency $F_{Best}$ providing the best power transmission efficiency among the N tracking frequencies, and changes the reference resonant frequency $F_{Ref}$ to the tracking frequency $F_{Best}$. In various examples, the N tracking frequencies may be set in advance. The reference resonant frequency may be changed by any method known to one of ordinary skill in the art. For example, any method of adjusting a value of an inductor or a capacitor known to one of ordinary skill in the art may be used. For example, a value of a capacitor may be adjusted by a switch connected to the capacitor in series or parallel, a variable capacitor may be used, or a resonator may be fabricated using a material having a variable magnetic permeability, or a variable permittivity, or both a variable magnetic permeability and a variable permittivity.

The controller 114 may adjust a frequency of the switching pulse signal used by the power amplifier 112. For example, by controlling the frequency of the switching pulse signal used by the power amplifier 112, the controller 114 may generate a modulation signal to be transmitted to the target device 120. In other words, the controller 114 may transmit a variety of data (not shown in FIG. 1) to the target device 120 using in-band communication. The controller 114 may also detect a reflected wave, and may demodulate a signal received from the target device 120 based on an envelope of the detected reflected wave.

The controller 114 may generate a modulation signal for in-band communication using various techniques. For example, the controller 114 may generate the modulation signal by turning on or off a switching pulse signal, by performing delta-sigma modulation, or using any other modulation technique known to one of ordinary skill in the art. Additionally, the controller 114 may generate a pulse-width modulation (PWM) signal having a predetermined envelope.

The communication unit 115 may perform out-band communication that employs a communication channel. The communication unit 115 may include a communication module, such as a ZigBee module, a Bluetooth module, or any other communication module known to one of ordinary skill in the art. The communication unit 115 may transmit data 140 to the target device 120 through the out-band communication.

The source resonator 131 transfers electromagnetic energy 130 to the target resonator 133. For example, the source resonator 131 transfers the communication power or the charging power to the target device 120 via a magnetic coupling with the target resonator 133.

As illustrated in FIG. 1, the target device 120 includes a matching network 121, a rectification unit 122 (labeled "rectifier" in FIG. 1 for conciseness), a DC/DC converter 123, a communication unit 124, a controller 125, a voltage detector 126, and a power detector 127.

The target resonator 133 receives the electromagnetic energy 130 from the source resonator 131. For example, the target resonator 133 receives the communication power or the charging power from the source device 110 via the magnetic coupling with the source resonator 131. Additionally, the target resonator 133 may receive data from the source device 110 using the in-band communication (not shown in FIG. 1).

The matching network 121 matches an input impedance viewed from the source device 110 to an output impedance viewed from a load. The matching network 121 may be configured with a combination of a capacitor and an inductor.

The rectification unit 122 generates a DC voltage by rectifying an AC voltage received from the target resonator 133.

The DC/DC converter 123 adjusts a level of the DC voltage that is output from the rectification unit 122 based on a voltage required by the load. As an example, the DC/DC converter 123 may adjust the level of the DC voltage output from the rectification unit 122 within in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used by the controller 125 to compute a transmission efficiency of power received from the source device 110. The detected current and the detected voltage of the output terminal may be used by the controller 125 to compute an amount of power transferred to the load. The controller 114 of the source device 110 may determine an amount of power that needs to be transmitted by the source device 110 based on a power required by the load and a power transferred to the load.

When the amount of power transferred to the load computed by the communication unit 124 is transmitted to the source device 110, the source device 110 may compute an amount of power that needs to be transmitted to the target device 120.

The communication unit 124 performs in-band communication to transmit or receive data using a resonant frequency. During the in-band communication, the controller 125 demodulates a received signal by detecting a signal between the target resonator 133 and the rectification unit 122, or detecting an output signal of the rectification unit 122. In other words, the controller 125 may demodulate a message received using the in-band communication.

Additionally, the controller 125 adjusts an impedance of the target resonator 133 using the matching network 121 to modulate a signal to be transmitted to the source device 110. For example, the controller 125 may increase the impedance of the target resonator 133 so that a reflected wave may be detected by the controller 114 of the source device 110. Depending on whether the reflected wave is detected, the controller 114 may detect a binary number, for example, "0" or "1." For example, when the reflected wave is detected, the controller 114 may detect "0," and when the reflected wave is not detected, the controller 114 may detect "1." Alternatively, when the reflected wave is detected, the controller 114 may detect "1," and when the reflected wave is not detected, the controller 114 may detect "0."

The communication unit 124 of the target device 120 may transmit a response message to the communication unit 115 of the source device 110. For example, the response message may include a type of a corresponding target, information about a manufacturer of a corresponding target, a model name of a corresponding target, a battery type of a corresponding target, a charging scheme of a corresponding target, an impedance value of a load of a corresponding target, information on characteristics of a target resonator of a corresponding target, information on a frequency band used by a corresponding target, an amount of power consumed by a corresponding target, an identifier (ID) of a corresponding target, information on a version or a standard of a corresponding target and any other information about a corresponding target.

The communication unit 124 may perform out-band communication using a separate communication channel. For example, the communication unit 124 may include a communication module, such as a ZigBee module, a Bluetooth module, or any other communication module known to one of ordinary skill in the art. The communication unit 124 may transmit or receive the data 140 to or from the source device 110 using the out-band communication.

The communication unit 124 may receive a wake-up request message from the source device 110, and the power detector 127 may detect an amount of power received by the target resonator 133. The communication unit 124 may transmit, to the source device 110, information on the detected amount of the power. The information on the detected amount of the power may include, for example, an input voltage value and an input current value of the rectification unit 122, an output voltage value and an output current value of the rectification unit 122, an output voltage value and an output current value of the DC/DC converter 123, and any other information about the detected amount of the power.

The controller 114 may set a resonance bandwidth of the source resonator 131. Based on a setting of the resonance bandwidth of the source resonator 131, a Q-factor of the source resonator 131 may be determined.

Additionally, the controller 125 may set a resonance bandwidth of the target resonator 133. Based on a setting of the resonance bandwidth of the target resonator 133, a Q-factor of the target resonator 133 may be determined. For example, the controller 125 may set the resonance bandwidth of the source resonator 131 to be wider or narrower than the resonance bandwidth of the target resonator 133.

The source device 110 and the target device 120 may communicate with each other in order to share information about the resonance bandwidth of the source resonator 131 and the resonance bandwidth of the target resonator 133. In an example in which power desired or required by the target device 120 is higher than a reference value, the Q-factor of the source resonator 131 may be set to a value greater than 100. In another example in which the power desired or required by the target device 120 is lower than the reference value, the Q-factor of the source resonator 131 may be set to a value less than 100.

In a wireless power transmission employing a resonance scheme, a resonance bandwidth is an important factor. Let $Q_t$ denote a Q-factor of energy coupling between the source resonator 131 and the target resonator 133. The value of $Q_t$ is affected by a change in a distance between the source resonator 131 and the target resonator 133, a change in a resonance impedance, impedance mismatching, a reflected signal, or any other facto affecting a Q-factor. $Q_t$ is inversely proportional to the resonance bandwidth as expressed by the following Equation 1:

$$\frac{\Delta_f}{f_0} = \frac{1}{Qt} \quad (1)$$

$$= \Gamma_{S,D} + \frac{1}{BW_S} + \frac{1}{BW_D}$$

In Equation 1, $f_0$ denotes a center frequency, $\Delta f$ denotes a bandwidth, $\Gamma_{S,D}$ denotes a reflection loss between the source resonator 131 and the target resonator 133, $BW_S$ denotes a resonance bandwidth of the source resonator 131, and $BW_D$ denotes a resonance bandwidth of the target resonator 133.

An efficiency U of wireless power transmission may be expressed by the following Equation 2:

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_k} \quad (2)$$

In Equation 2, $\kappa$ denotes a coupling coefficient of energy coupling between the source resonator 131 and the target resonator 133, $\Gamma_S$ denotes a reflection coefficient of the source resonator 131, $\Gamma_D$ denotes a reflection coefficient of the target resonator 133, $\omega_0$ denotes a resonant frequency, M denotes a mutual inductance between the source resonator 131 and the target resonator 133, $R_S$ denotes an impedance of the source resonator 131, $R_D$ denotes an impedance of the target resonator 133, $Q_S$ denotes a Q-factor of the source resonator 131, $Q_D$ denotes a Q-factor of the target resonator 133, and $Q_k$ denotes a Q-factor of the energy coupling between the source resonator 131 and the target resonator 133, and is the same as Qt discussed above in connection with Equation 1.

As can be seen from Equation 2, the Q-factors $Q_S$ and $Q_D$ have a great effect on the efficiency of the wireless power transmission. Accordingly, to increase the efficiency of the wireless power transmission, the Q-factors $Q_S$ and $Q_D$ may be set to high values. However, even when the Q-factors $Q_S$ and $Q_D$ are set to extremely high values, the efficiency of the wireless power transmission may be reduced due to a change in the coupling coefficient $\kappa$, a change in the distance between the source resonator 131 and the target resonator 133, a change in the resonance impedance, impedance mismatching or a change in any other factor affecting the efficiency of the wireless power transmission.

If the resonance bandwidths $BW_S$ and $BW_D$ of the source resonator 131 and the target resonator 133 are set to be very narrow in order to increase the efficiency of the wireless power transmission, impedance mismatching between the source resonator 131 and the target resonator 133 may easily occur due to even a small external influence. In terms of impedance mismatching, Equation 1 may be rewritten as the following Equation 3:

$$\frac{\Delta f}{f_0} = \frac{\sqrt{VSWR} - 1}{Qt\sqrt{VSWR}} \quad (3)$$

In an example in which an unbalanced relationship of a resonance bandwidth or a bandwidth of an impedance matching frequency between the source resonator 131 and the target resonator 133 is maintained, a reduction in the efficiency of the wireless power transmission may be prevented. The reduction in efficiency may be a result of a change in the coupling coefficient $\kappa$, a change in the distance between the source resonator 131 and the target resonator 133, a change in the resonance impedance, impedance mismatching, or a change in any other factor affecting the efficiency of the wireless power transmission.

Based on Equations 1 through 3, an unbalanced relationship between the Q-factors $Q_S$ and $Q_D$ may be maintained in an example in which the unbalanced relationship of the resonance bandwidth or the bandwidth of the impedance matching frequency between the source resonator 131 and the target resonator 133 is maintained.

In FIG. 1, the source device 110 may wirelessly transmit wake-up power used to wake up the target device 120, and may broadcast a configuration signal used to configure a wireless power transfer network. The source device 110 may receive, from the target device 120, a search frame including a value of a receiving sensitivity of the configuration signal in the target device 120, may permit the target device 120 to join the wireless power transfer network, and may transmit, to the target device 120, an ID used to identify the target device 120 in the wireless power transfer network. Additionally, the source device 110 may generate charging power through power control, and may wirelessly transmit the charging power to the target device 120.

Additionally, the target device 120 may receive wake-up power from at least one of a plurality of source devices, and may activate a communication function using the wake-up power. The target device 120 may receive a configuration signal used to configure a wireless power transfer network from each of the plurality of source devices, may select one of the source devices, such as the source device 110 in FIG. 1, based on a receiving sensitivity of the configuration signal in the target device 120, and may wirelessly receive power from the selected source device 110.

In the following description of FIGS. 2A through 4B, unless otherwise indicated, the term "resonator" may refer to both a source resonator and a target resonator.

Figure 2A:
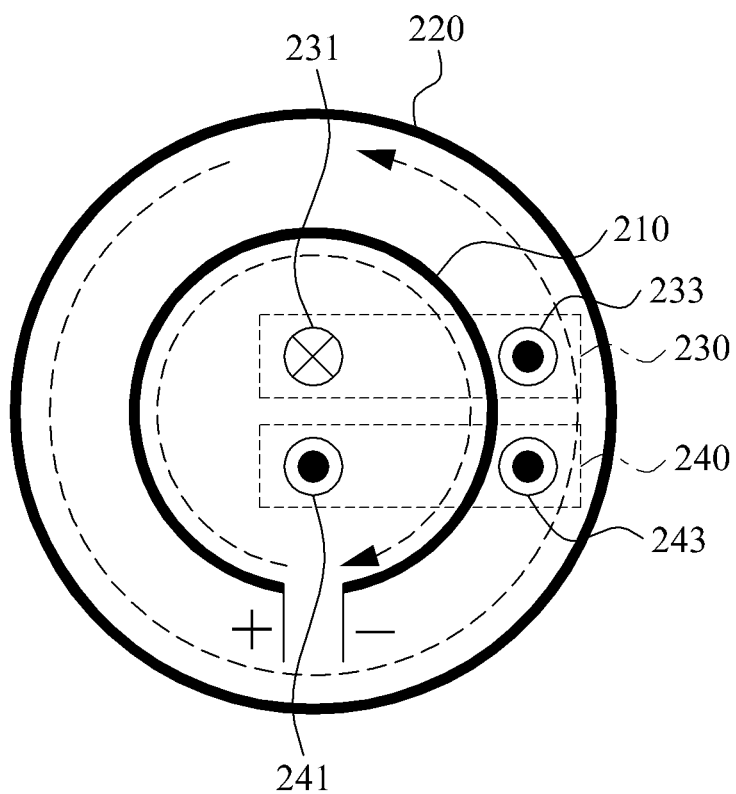
FIGS. 2A and 2B are diagrams illustrating examples of a distribution of a magnetic field in a feeder and a resonator of a wireless power transmitter.
Figure 2B:
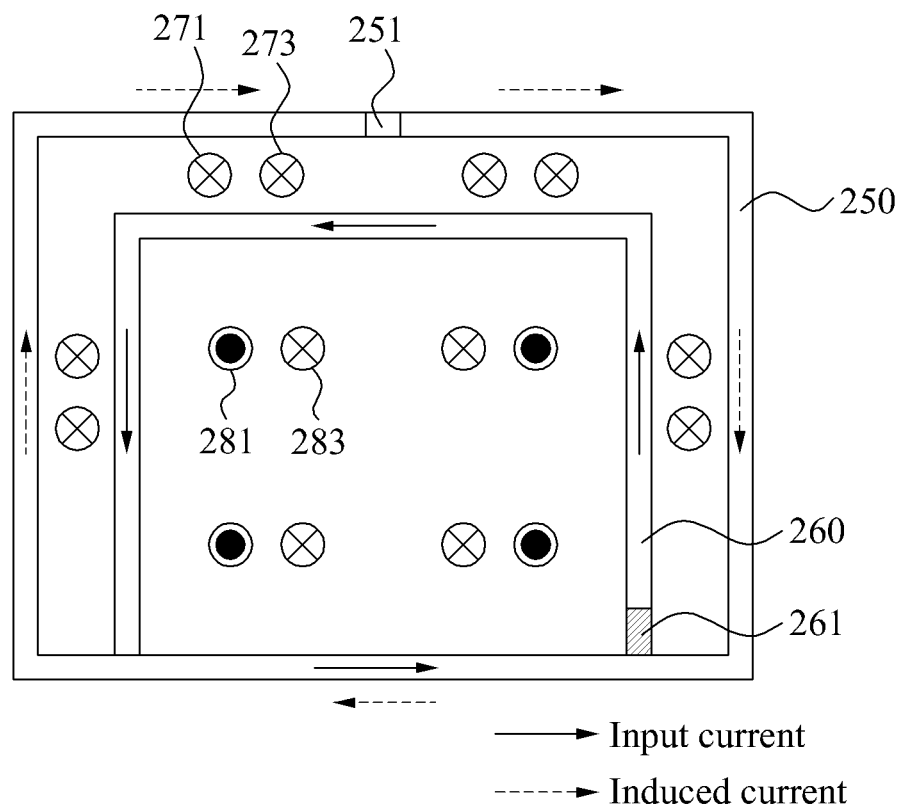

FIGS. 2A and 2B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 2A is a diagram illustrating an example of a structure of a wireless power transmitter in which a feeder 210 and a resonator 220 do not have a common ground. Referring to FIG. 2A, as an input current flows into the feeder 210 through a terminal labeled "+" and out of the feeder 210 through a terminal labeled "−", a magnetic field 230 is formed by the input current. A direction 231 of the magnetic field 230 inside the feeder 210 is into the plane of FIG. 2A, and is opposite to a direction 233 of the magnetic field 230 outside the feeder 210, which is out of the plane of FIG. 2A. The magnetic field 230 formed by the feeder 210 induces a current to flow in the resonator 220. The direction of the induced current in the resonator 220 is opposite to a direction of the input current in the feeder 210 as indicated by the dashed lines with arrowheads in FIG. 2A.

The induced current in the resonator 220 forms a magnetic field 240. A direction of the magnetic field 240 formed by the induced current is the same at all positions inside the resonator 220, and is out of the plane of FIG. 2A. Accordingly, a direction 241 of the magnetic field 240 formed by the resonator 220 inside the feeder 210 is the same as a direction 243 of the magnetic field 240 formed by the resonator 220 outside the feeder 210.

Consequently, when the magnetic field 230 formed by the feeder 210 and the magnetic field 240 formed by the resonator 220 are combined, the strength of the total magnetic field inside the resonator 220 decreases inside the feeder 210, but increases outside the feeder 210. In an example in which power is supplied to the resonator 220 through the feeder 210 configured as illustrated in FIG. 2A, the strength of the total magnetic field decreases in the center of the resonator 220, but increases outside the resonator 220. In another example in which a magnetic field is randomly or not uniformly distributed in the resonator 220, it is difficult to perform impedance matching since an input impedance will frequently vary. Additionally, when the strength of the total magnetic field increases, an efficiency of wireless power transmission increases. Conversely, when the strength of the total magnetic field decreases, the efficiency of wireless power transmission decreases. Accordingly, the power transmission efficiency is reduced on average when the magnetic field is randomly or not uniformly distributed in the resonator 220 compared to when the magnetic field is uniformly distributed in the resonator 220.

FIG. 2B is a diagram illustrating an example of a structure of a wireless power transmitter in which a source resonator 250 and a feeder 260 have a common ground. The source resonator 250 includes a capacitor 251. The feeder 260 receives a radio frequency (RF) signal via a port 261. When the RF signal is input to the feeder 260, an input current is generated in the feeder 260. The input current flowing in the feeder 260 forms a magnetic field, and a current is induced in the source resonator 250 by the magnetic field. Additionally, another magnetic field is formed by the induced current flowing in the source resonator 250. In this example, a direction of the input current flowing in the feeder 260 is opposite to a direction of the induced current flowing in the source resonator 250. Accordingly, in a region between the source resonator 250 and the feeder 260, a direction 271 of the magnetic field formed by the input current is the same as a direction 273 of the magnetic field formed by the induced current, and thus the strength of the total magnetic field increases in the region between the source resonator 250 and the feeder 260. Conversely, inside the feeder 260, a direction 281 of the magnetic field formed by the input current is opposite to a direction 283 of the magnetic field formed by the induced current, and thus the strength of the total magnetic field decreases inside the feeder 260. Therefore, the strength of the total magnetic field decreases in the center of the source resonator 250, but increases outside the source resonator 250.

An input impedance may be adjusted by adjusting an internal area of the feeder 260. The input impedance refers to an impedance viewed in a direction from the feeder 260 to the source resonator 250. When the internal area of the feeder 260 is increased, the input impedance is increased. Conversely, when the internal area of the feeder 260 is decreased, the input impedance is decreased. However, if the magnetic field is randomly or not uniformly distributed in the source resonator 250, a value of the input impedance may vary based on a location of a target device even if the internal area of the feeder 260 has been adjusted to adjust the input impedance to match an output impedance of a power amplifier for a specific location of the target device. Accordingly, a separate matching network may be required to match the input impedance to the output impedance of a power amplifier. For example, when the input impedance is increased, a separate matching network may be used to match the increased input impedance to a relatively low output impedance of the power amplifier.

In an example in which a target resonator has the same configuration as the source resonator 250, and when a feeder of the target resonator has the same configuration as the feeder 260, a separate matching network may be required because a direction of current flowing in the target resonator is opposite to a direction of induced current flowing in the feeder of the target resonator.

Figure 3A:
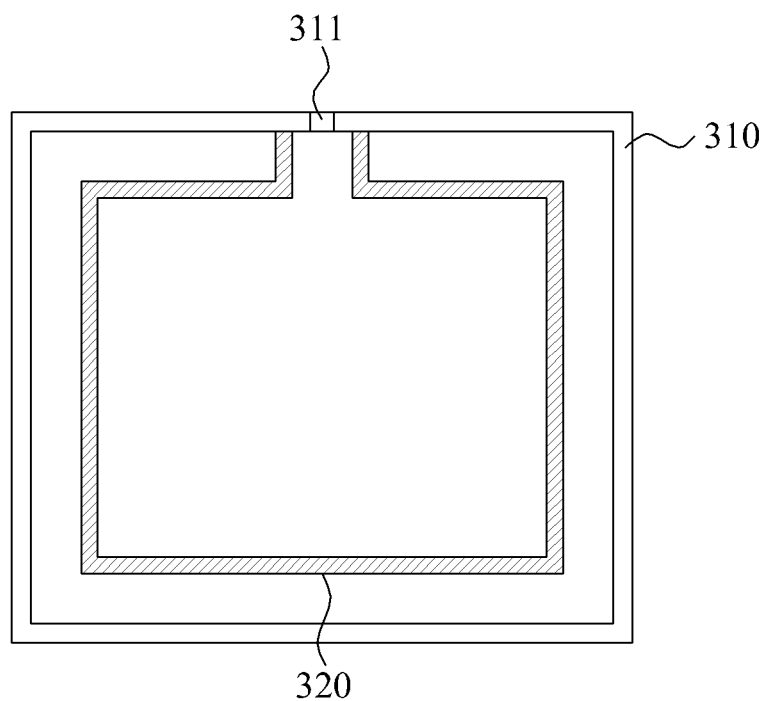
FIGS. 3A and 3B are diagrams illustrating an example of a wireless power transmitter including a resonator and a feeder.
Figure 3B:
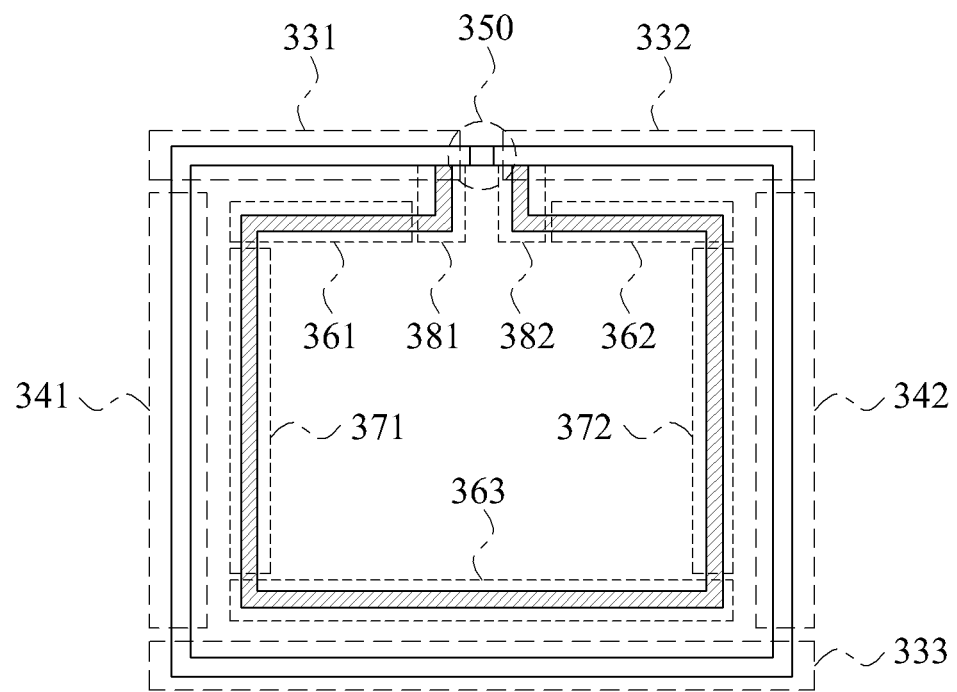

FIGS. 3A and 3B are diagrams illustrating an example of a wireless power transmitter including a resonator and a feeder. Referring to FIG. 3A, the wireless power transmitter includes a resonator 310 and a feeder 320. The resonator 310 includes a capacitor 311. The feeder 320 is electrically connected to both ends of the capacitor 311.

FIG. 3B is a diagram illustrating in greater detail a structure of the wireless power transmitter of FIG. 3A. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is inserted in series between a first signal conducting portion 331 and a second signal conducting portion 332, causing an electric field to be concentrated in the capacitor 350. Generally, a transmission line includes at least one conductor in an upper portion of the transmission line, and at least one conductor in a lower portion of the transmission line. A current may flow through the at least one conductor disposed in the upper portion of the transmission line, and the at least one conductor disposed in the lower portion of the transmission line may be electrically grounded. In this example, a conductor disposed in an upper portion of the first transmission line in FIG. 3B is separated into two portions that will be referred to as the first signal conducting portion 331 and the second signal conducting portion 332. A conductor disposed in a lower portion of the first transmission line in FIG. 3B will be referred to as a first ground conducting portion 333.

As illustrated in FIG. 3B, the resonator 310 has a generally two-dimensional (2D) structure. The first transmission line includes the first signal conducting portion 331 and the second signal conducting portion 332 in the upper portion of the first transmission line, and includes the first ground conducting portion 333 in the lower portion of the first transmission line. The first signal conducting portion 331 and the second signal conducting portion 332 are disposed to face the first ground conducting portion 333. A current flows through the first signal conducting portion 331 and the second signal conducting portion 332.

One end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first ground conducting portion 333. Accordingly, the first signal conducting portion 331, the second signal conducting portion 332, the first ground conducting portion 333, the first conductor 341, and the second conductor 342 are connected to each other, causing the resonator 310 to have an electrically closed loop structure. The term "loop structure" includes a polygonal structure, a circular structure, a rectangular structure, and any other geometrical structure that is closed, i.e., that does not have any opening in its perimeter. The phrase "having a loop structure" indicates a structure that is electrically closed.

The capacitor 350 is inserted into an intermediate portion of the first transmission line. In the example in FIG. 3B, the capacitor 350 is inserted into a space between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric material having a relatively high permittivity disposed between the zigzagged conductor lines.

The capacitor 350 inserted into the first transmission line may cause the resonator 310 to have a characteristic of a metamaterial. A metamaterial is a material having a predetermined electrical property that is not found in nature, and thus may have an artificially designed structure. All materials existing in nature have a magnetic permeability and a permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial having a magnetic permeability and/or a permittivity that is not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the magnetic permeability of the metamaterial and a sign of the permittivity of the metamaterial.

If the capacitor 350 is a lumped element capacitor and a capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth order resonance characteristic at the target frequency, and any other suitable criterion. Based on any one or any combination of the aforementioned criteria, the capacitance of the capacitor 350 may be determined.

The resonator 310, hereinafter referred to as the MNG resonator 310, may have a zeroth order resonance characteristic of having a resonant frequency when a propagation constant is "0". If the resonator 310 has the zeroth order resonance characteristic, the resonant frequency is independent of a physical size of the MNG resonator 310. By changing the capacitance of the capacitor 350, the resonant frequency of the MNG resonator 310 may be changed without changing the physical size of the MNG resonator 310.

In a near field, the electric field is concentrated in the capacitor 350 inserted into the first transmission line, causing the magnetic field to become dominant in the near field. The MNG resonator 310 has a relatively high Q-factor when the capacitor 350 is a lumped element capacitor, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 3B, a magnetic core passing through the MNG resonator 310 may be provided to increase a power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 in an upper portion of the second transmission line, and includes a second ground conducting portion 363 in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

One end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel to both ends of the capacitor 350. The fifth conductor 381 and the sixth conductor 382 may be used as an input port to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeder 320 to have an electrically closed loop structure. The term "loop structure" includes a polygonal structure, a circular structure, a rectangular structure, and any other geometrical structure that is closed, i.e., that does not have any opening in its perimeter. The phrase "having a loop structure" indicates a structure that is electrically closed.

If an RF signal is received is input to the fifth conductor 381 or the sixth conductor 382, an input current flows through the feeder 320 and the resonator 310, generating a magnetic field that induces a current in the resonator 310. A direction of the input current flowing through the feeder 320 is identical to a direction of the induced current flowing through the resonator 310, thereby causing the strength of the total magnetic field to increase in the center of the resonator 310, and decrease near the outer periphery of the resonator 310.

An input impedance is determined by an area of a region between the resonator 310 and the feeder 320. Accordingly, a separate matching network used to match the input impedance to an output impedance of a power amplifier may not be necessary. However, if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have a structure identical to a structure of the resonator 310. For example, if the resonator 310 has a loop structure, the feeder 320 may also have a loop structure. As another example, if the resonator 310 has a circular structure, the feeder 320 may also have a circular structure.

Figure 4A:
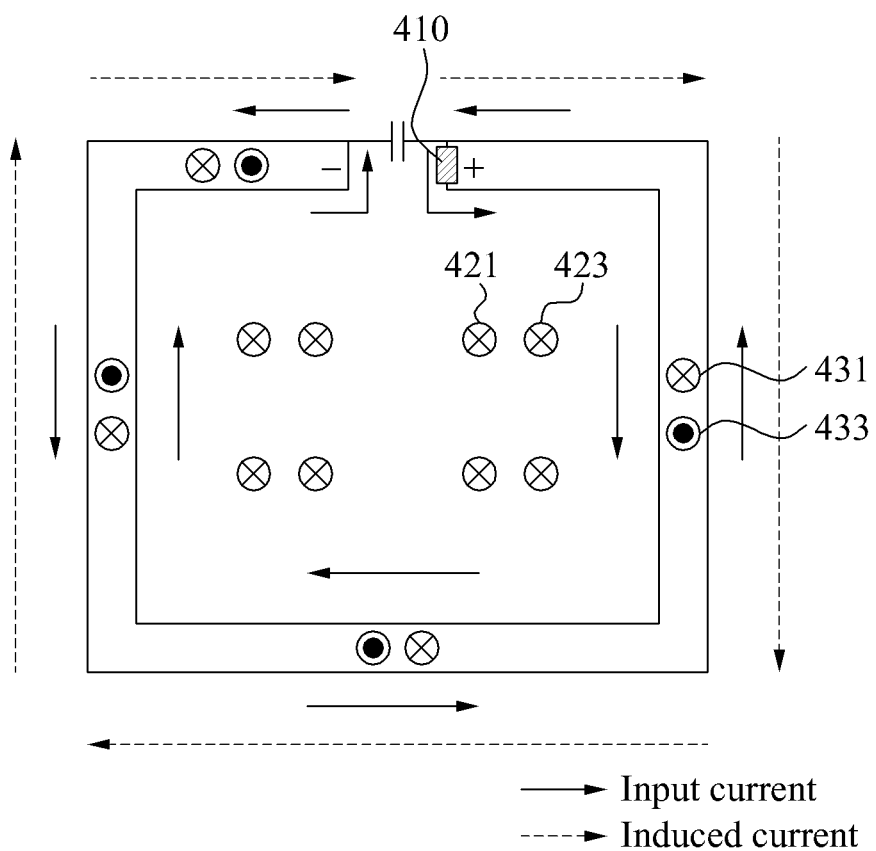
FIG. 4A is a diagram illustrating an example of a distribution of a magnetic field inside a resonator produced by feeding of a feeder.

FIG. 4A is a diagram illustrating an example of a distribution of a magnetic field inside a resonator produced by feeding of a feeder. FIG. 4A more simply illustrates the resonator 310 and the feeder 320 of FIGS. 3A and 3B, and the names of the various elements in FIG. 3B will be used in the following description of FIG. 4A without reference numerals.

A feeding operation may be an operation of supplying power to a source resonator in wireless power transmission, or an operation of supplying AC power to a rectification unit in wireless power transmission. FIG. 4A illustrates a direction of an input current flowing in the feeder, and a direction of an induced current flowing in the source resonator. Additionally, FIG. 4A illustrates a direction of a magnetic field formed by the input current of the feeder, and a direction of a magnetic field formed by the induced current of the source resonator.

Referring to FIG. 4A, the fifth conductor or the sixth conductor of the feeder may be used as an input port 410. In the example in FIG. 4A, the sixth conductor of the feeder is being used as the input port 410. An RF signal is input to the input port 410. The RF signal may be output from a power amplifier. The power amplifier may increase and decrease an amplitude of the RF signal based on a power requirement of a target device. The RF signal input to the input port 410 is represented in FIG. 4A as an input current flowing in the feeder. The input current flows in a clockwise direction in the feeder along the second transmission line of the feeder. The fifth conductor and the sixth conductor of the feeder are electrically connected to the resonator. More specifically, the fifth conductor of the feeder is connected to the first signal conducting portion of the resonator, and the sixth conductor of the feeder is connected to the second signal conducting portion of the resonator. Accordingly, the input current flows in both the resonator and the feeder. The input current flows in a counterclockwise direction in the resonator along the first transmission line of the resonator. The input current flowing in the resonator generates a magnetic field, and the magnetic field induces a current in the resonator. The induced current flows in a clockwise direction in the resonator along the first transmission line of the resonator. The induced current in the resonator transfers energy to the capacitor of the resonator, and also generates a magnetic field. In FIG. 4A, the input current flowing in the feeder and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 4A, inside the feeder, a direction 421 of the magnetic field generated by the input current flowing in the feeder is identical to a direction 423 of the magnetic field generated by the induced current flowing in the resonator. Accordingly, the strength of the total magnetic field increases inside the feeder.

In contrast, as illustrated in FIG. 4A, in a region between the feeder and the resonator, a direction 433 of the magnetic field generated by the input current flowing in the feeder is opposite to a direction 431 of the magnetic field generated by the induced current flowing in the resonator. Accordingly, the strength of the total magnetic field decreases in the region between the feeder and the resonator.

Typically, in a resonator having a loop structure, a strength of a magnetic field decreases in the center of the resonator, and increases near an outer periphery of the resonator. However, referring to FIG. 4A, since the feeder is electrically connected to both ends of the capacitor of the resonator, the direction of the induced current in the resonator is identical to the direction of the input current in the feeder. Since the direction of the induced current in the resonator is identical to the direction of the input current in the feeder, the strength of the total magnetic field increases inside the feeder, and decreases outside the feeder. As a result, due to the feeder, the strength of the total magnetic field increases in the center of the resonator having the loop structure, and decreases near an outer periphery of the resonator, thereby compensating for the normal characteristic of the resonator having the loop structure in which the magnetic field decreases in the center of the resonator, and increases near an outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 4B:
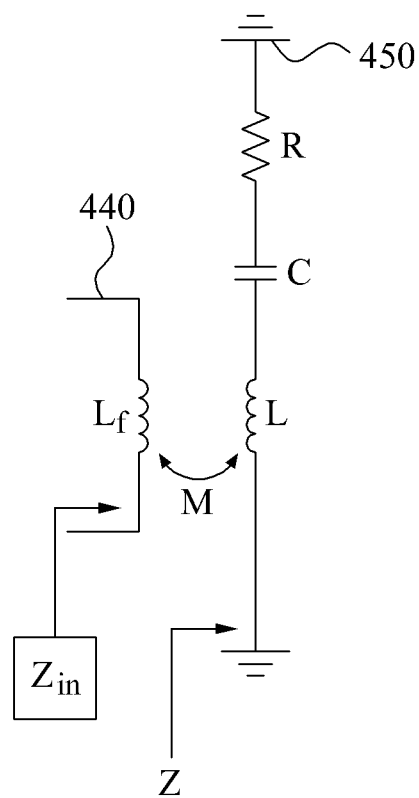
FIG. 4B is a diagram illustrating examples of equivalent circuits of a feeder and a resonator.

FIG. 4B is a diagram illustrating examples of equivalent circuits of a feeder and a resonator. Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An input impedance $Z_{in}$ viewed in a direction from the feeder 440 to the resonator 450 may expressed by the following Equation 4:

$$Z_{in} = \frac{(\omega M)^2}{Z} \quad (4)$$

In Equation 4, M denotes a mutual inductance between the feeder 440 and the resonator 450, $\omega$ denotes a resonant frequency of the feeder 440 and the resonator 450, and Z denotes an impedance viewed in a direction from the resonator 450 to a target device. As can be seen from Equation 4, the input impedance $Z_{in}$ is proportion to the square of the mutual inductance M. Accordingly, the input impedance $Z_{in}$ may be adjusted by adjusting the mutual inductance M. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

In a target resonator and a feeder included in a wireless power receiver, a magnetic field may be distributed as illustrated in FIG. 4A. For example, the target resonator may receive wireless power from a source resonator via magnetic coupling. The received wireless power induces a current in the target resonator. The induced current in the target resonator generates a magnetic field, which induces a current in the feeder. If the target resonator is connected to the feeder as illustrated in FIG. 4A, a direction of the induced current flowing in the target resonator will be identical to a direction of the induced current flowing in the feeder. Accordingly, for the reasons discussed above in connection with FIG. 4A, the strength of the total magnetic field will increase inside the feeder, and will decrease in a region between the feeder and the target resonator.

Figure 5:
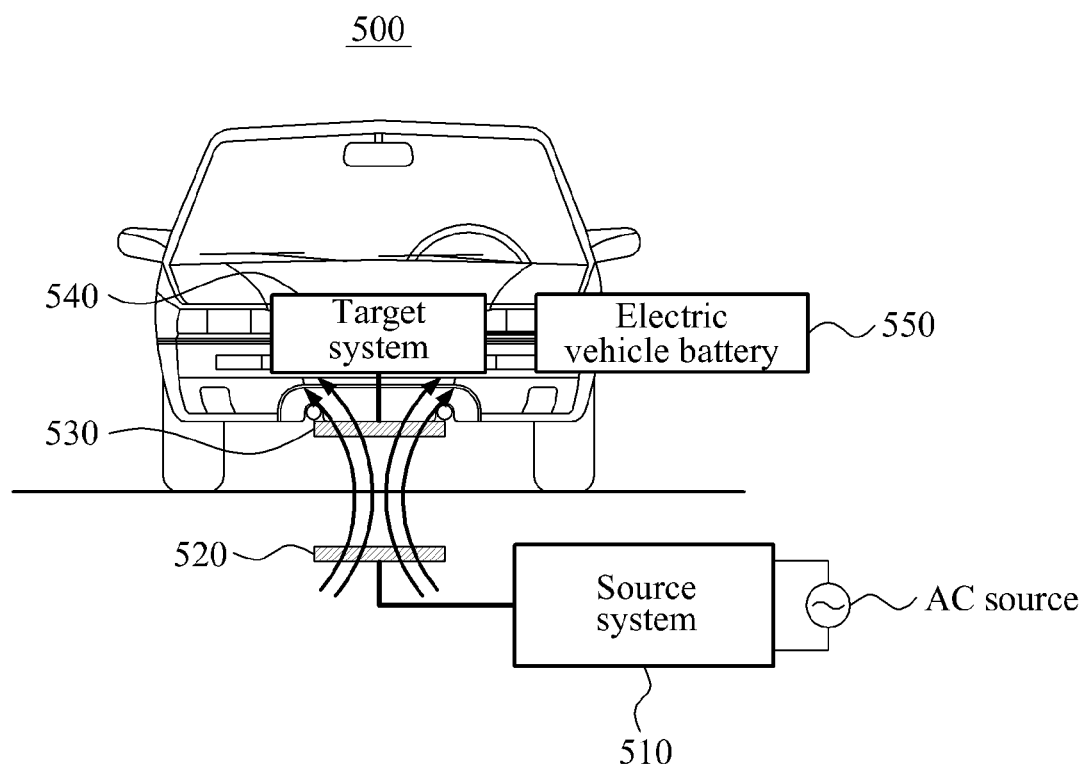
FIG. 5 is a diagram illustrating an example of an electric vehicle charging system.

FIG. 5 is a diagram illustrating an example of an electric vehicle charging system. Referring to FIG. 5, an electric vehicle charging system 500 includes a source system 510, a source resonator 520, a target resonator 530, a target system 540, and an electric vehicle battery 550.

In one example, the electric vehicle charging system 500 has a structure similar to the structure of the wireless power transmission system of FIG. 1. The source system 510 and the source resonator 520 in the electric vehicle charging system 500 operate as a source. The target resonator 530 and the target system 540 in the electric vehicle charging system 500 operate as a target.

In one example, the source system 510 includes a variable SMPS, a power amplifier (PA), a matching network, a controller, a communication unit, and a power detector similar to those of the source device 110 of FIG. 1. In one example, the target system 540 includes a matching network, a rectification unit, a DC/DC converter, a communication unit, a controller, a voltage detector, and a power detector similar to those of the target device 120 of FIG. 1. The electric vehicle battery 550 is charged by the target system 540. The electric vehicle charging system 500 may use a resonant frequency in a band of a few kHz to tens of MHz.

The source system 510 generates power based on a type of the vehicle being charged, a capacity of the electric vehicle battery 550, and a charging state of the electric vehicle battery 550, and wirelessly transmits the generated power to the target system 540 via a magnetic coupling between the source resonator 520 and the target resonator 530.

The source system 510 may control an alignment of the source resonator 520 and the target resonator 530. For example, when the source resonator 520 and the target resonator 530 are not aligned, the controller of the source system 510 may transmit a message to the target system 540 to control the alignment of the source resonator 520 and the target resonator 530.

For example, when the target resonator 530 is not located in a position enabling maximum magnetic coupling, the source resonator 520 and the target resonator 530 are not properly aligned. When a vehicle does not stop at a proper position to accurately align the source resonator 520 and the target resonator 530, the source system 510 may instruct a position of the vehicle to be adjusted to control the source resonator 520 and the target resonator 530 to be aligned. However, this is just an example, and other methods of aligning the source resonator 520 and the target resonator 530 may be used.

The source system 510 and the target system 540 may transmit or receive an ID of a vehicle and exchange various messages by communicating with each other.

The descriptions of FIGS. 1 through 4B are also applicable to the electric vehicle charging system 500. However, the electric vehicle charging system 500 may use a resonant frequency in a band of a few kHz to tens of MHz, and may transmit power that is equal to or higher than tens of watts to charge the electric vehicle battery 550.

FIGS. 6A through 7B are diagrams illustrating examples of applications in which a wireless power receiver and a wireless power transmitter may be used.

Figure 6A:
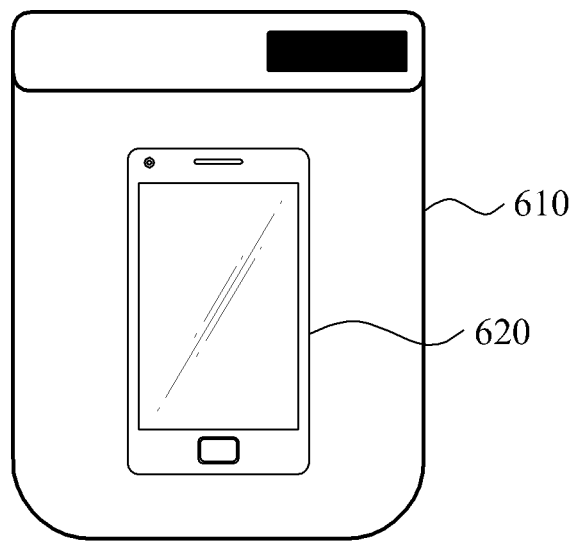
FIGS. 6A through 7B are diagrams illustrating examples of applications in which a wireless power receiver and a wireless power transmitter may be used.
Figure 6B:
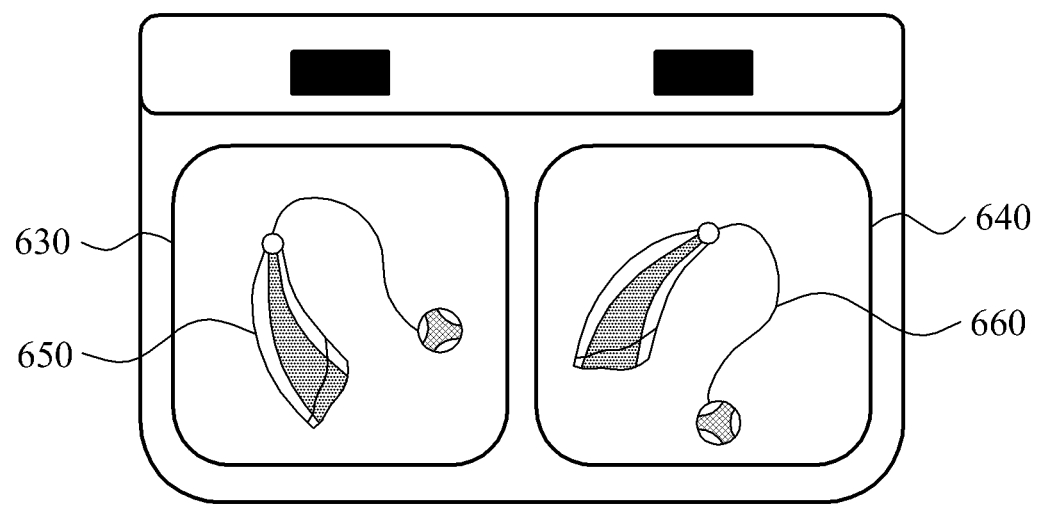

FIG. 6A is a diagram illustrating an example of wireless power charging between a pad 610 and a mobile terminal 620, and FIG. 6B is a diagram illustrating an example of wireless power charging between pads 630 and 640 and hearing aids 650 and 660.

In the example of FIG. 6A, a wireless power transmitter is mounted in the pad 610, and a wireless power receiver is mounted in the mobile terminal 620. The pad 610 is used to charge a single mobile terminal, namely, the mobile terminal 620.

In the example of FIG. 6B, two wireless power transmitters are respectively mounted in the pads 630 and 640. The hearing aids 650 and 660 may be used for a left ear and a right ear, respectively. In this example, two wireless power receivers are respectively mounted in the hearing aids 650 and 660.

Figure 7A:
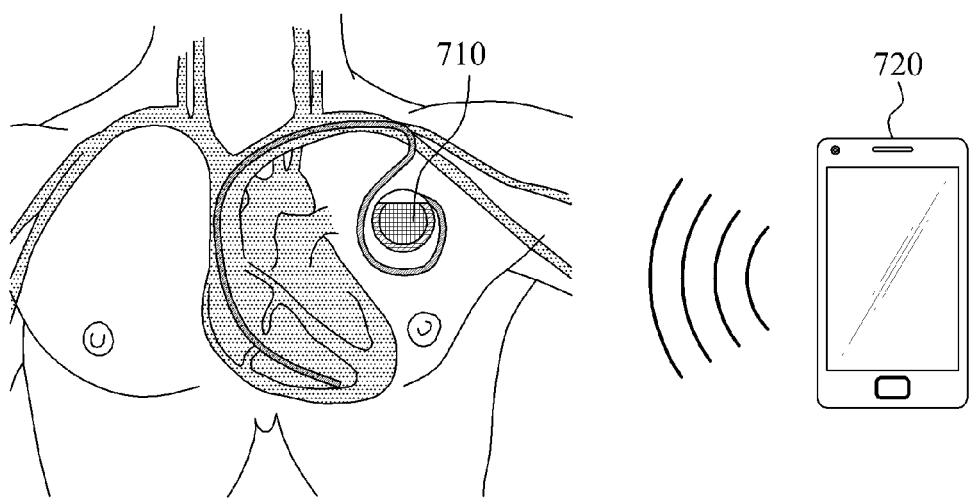
Figure 7B:
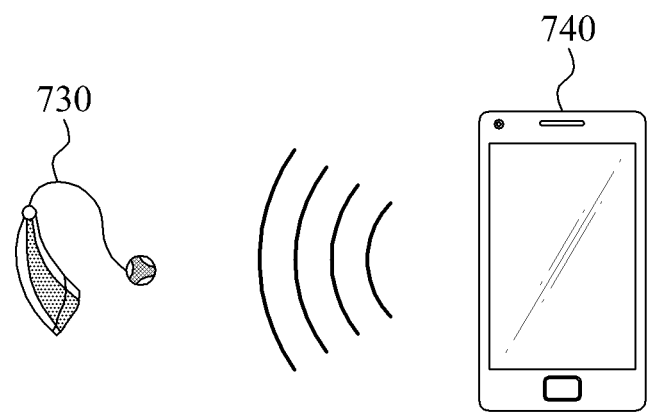

FIG. 7A is a diagram illustrating an example of wireless power charging between an electronic device 710 that is inserted into a human body and a mobile terminal 720. FIG. 7B is a diagram illustrating an example of wireless power charging between a hearing aid 730 and a mobile terminal 740.

In the example of FIG. 7A, a wireless power transmitter and a wireless power receiver are mounted in the mobile terminal 720, and a wireless power receiver is mounted in the electronic device 710. The electronic device 710 is charged by receiving power from the mobile terminal 720.

In the example of FIG. 7B, a wireless power transmitter and a wireless power receiver are mounted in the mobile terminal 740, and a wireless power receiver is mounted in the hearing aid 730. The hearing aid 730 is charged by receiving power from the mobile terminal 740. Low-power electronic devices, such as Bluetooth earphones, may also be charged by receiving power from the mobile terminal 740.

Figure 8:
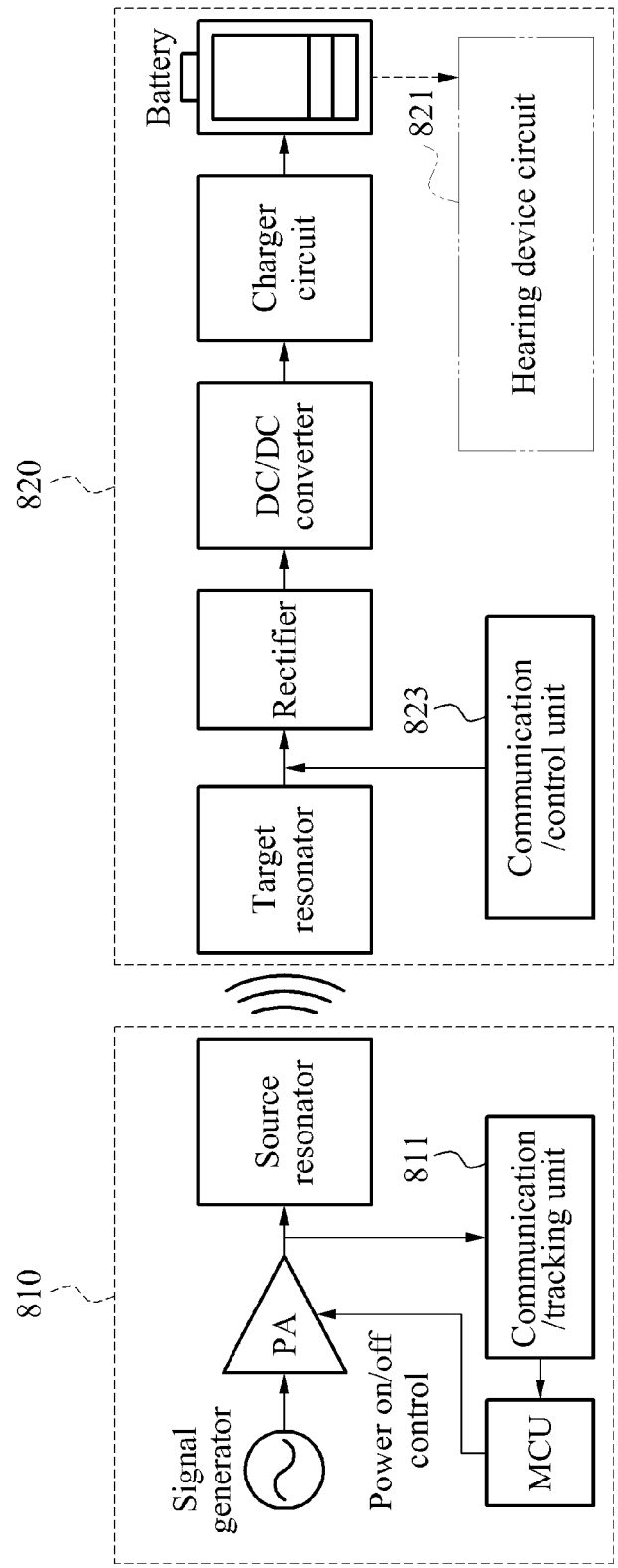
FIG. 8 is a diagram illustrating an example of a wireless power transmitter and a wireless power receiver.

FIG. 8 is a diagram illustrating an example of a wireless power transmitter and a wireless power receiver. A wireless power transmitter 810 of FIG. 8 may be mounted in the pad 610 of FIG. 6A, the pads 630 and 640 of FIG. 6B, the mobile terminal 720 of FIG. 7A, and the mobile terminal 740 of FIG. 7B. A wireless power receiver 820 of FIG. 8 may be mounted in the mobile terminal 620 of FIG. 6A, the hearing aids 650 and 660 of FIG. 6B, the electronic device 710 and the mobile terminal 720 of FIG. 7A, and the hearing aid 730 and the mobile terminal 740 of FIG. 7B.

The wireless power transmitter 810 has a configuration similar to a configuration of the source device 110 of FIG. 1. For example, the wireless power transmitter 810 may include a unit configured to transmit power using magnetic coupling. As illustrated in FIG. 8, the wireless power transmitter 810 includes a signal generator, a power amplifier (PA), a communication tracking unit 811, a micro control unit (abbreviated "MCU" in FIG. 8 for conciseness), and a source resonator. The signal generator generates a signal having a resonant frequency of the source resonator. The communication/tracking unit 811 communicates with the wireless power receiver 820, and controls an impedance and a resonant frequency to maintain a wireless power transmission efficiency. The communication/tracking unit 811 and the MCU perform functions similar to functions performed by the controller 114 and the communication unit 115 of FIG. 1. The resonant frequency may be controlled by any method known to one of ordinary skill in the art. For example, any method of adjusting a value of an inductor or a capacitor known to one of ordinary skill in the art may be used. For example, a value of a capacitor may be adjusted by a switch connected to the capacitor in series or parallel, a variable capacitor may be used, or a resonator may be fabricated using a material having a variable magnetic permeability, or a variable permittivity, or both a variable magnetic permeability and a variable permittivity.

The wireless power receiver 820 has a configuration similar to a configuration of the target device 120 of FIG. 1. For example, the wireless power receiver 820 may include a unit configured to wirelessly receive power and to charge a battery with the received power. As illustrated in FIG. 8, the wireless power receiver 820 includes a target resonator, a rectifier, a DC/DC converter, a charger circuit, a battery and a communication/control unit 823. The communication/control unit 823 communicates with the wireless power transmitter 810, and performs an operation to protect a device powered by the wireless power receiver 820 from overvoltage and overcurrent.

The wireless power receiver 820 may include a hearing device circuit 821. The hearing device circuit 821 is operated by the battery. The hearing device circuit 821 may include a microphone, an analog-to-digital converter (ADC), a processor, a digital-to-analog converter (DAC), and a receiver. For example, the hearing device circuit 821 may have the same configuration as a hearing aid.

Figure 9:
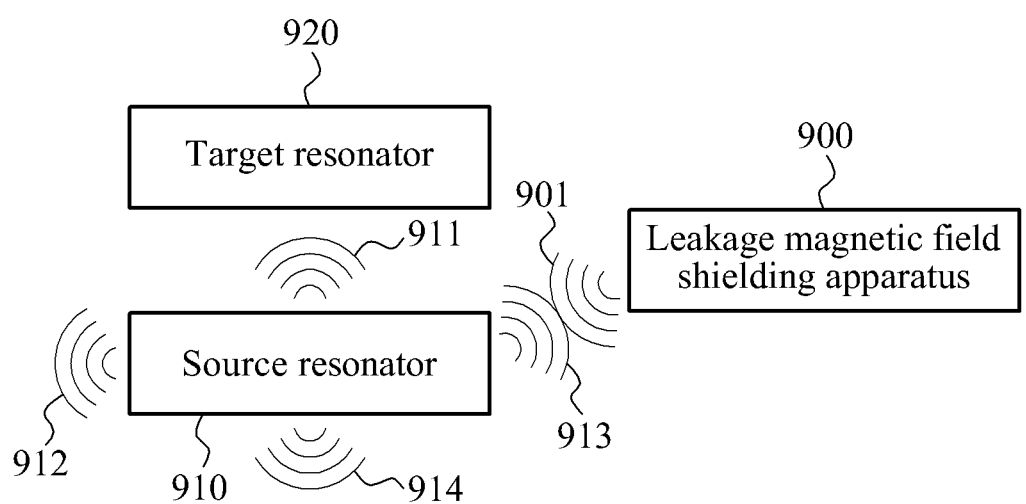
FIG. 9 is a diagram illustrating an example of a wireless power transmission system including a leakage magnetic field shielding apparatus.

FIG. 9 is a diagram illustrating an example of a wireless power transmission system including a leakage magnetic field shielding apparatus. Referring to FIG. 9, the wireless power transmission system includes a leakage magnetic field shielding apparatus 900, a source resonator 910, and a target resonator 920.

The source resonator 910 generates a power transmission magnetic field 911 to wirelessly transmit power. For example, the source resonator 910 may have a configuration similar to a configuration of the source resonator 520 of FIG. 5. To generate the power transmission magnetic field 911, the source resonator 910 receives power from the source system 510 of FIG. 5.

The target resonator 920 generates power from the power transmission magnetic field 911 using the same resonant frequency as the source resonator 910. The target resonator 920 receives power from the source resonator 910 via an energy tunnel that is formed by the same resonant frequency as the source resonator 910. The target resonator 920 may have a configuration similar to a configuration of the target resonator 530 of FIG. 5, and may supply power to the target system 540 of FIG. 5.

The source resonator 910 generates a magnetic field in all directions when the source resonator 910 generates the power transmission magnetic field 911. For example, when the source resonator 910 generates the power transmission magnetic field 911, the source resonator also generates leakage magnetic fields 912, 913, and 914 in addition to the power transmission magnetic field 911 that is transmitted to the target resonator 920 for wireless power transmission.

The leakage magnetic field shielding apparatus 900 generates a counterbalance magnetic field 901 in response to the leakage magnetic field 913 that is transmitted toward the leakage magnetic field shielding apparatus 900 from the source resonator 910. The counterbalance magnetic field 901 shields a location where the leakage magnetic field shielding apparatus 900 is mounted from the leakage magnetic field 913.

The counterbalance magnetic field 901 has the same intensity as the leakage magnetic field 913, and has a phase that is opposite to a phase of the leakage magnetic field 913, causing the counterbalance magnetic field 901 and the leakage magnetic field 913 to cancel each other out, or in other words, enabling the counterbalance magnetic field 901 to counterbalance the leakage magnetic field 913. To shield the location where the leakage magnetic field shielding apparatus 900 is mounted from the leakage magnetic field 913, the leakage magnetic field shielding apparatus 900 transmits the counterbalance magnetic field 901 toward the source resonator 910 in a direction opposite to a direction in which the source resonator 910 transmits the leakage magnetic field 913 toward the leakage magnetic field shielding apparatus 900 to counterbalance the leakage magnetic field 913.

The leakage magnetic field shielding apparatus 900 may be either a passive-type leakage magnetic field shielding apparatus or an active-type leakage magnetic field shielding apparatus. The passive-type leakage magnetic field shielding apparatus is configured to generate a counterbalance magnetic field in response to a leakage magnetic field without any external control. The active-type leakage magnetic field shielding apparatus is configured to generate a counterbalance magnetic field when power is supplied under external control. An example of a passive-type leakage magnetic field shielding apparatus will be described below with reference to FIG. and examples of an active-type leakage magnetic field shielding apparatus 900 will be described below with reference to FIGS. 13, 14, and 16.

A location and an angle at which the leakage magnetic field shielding apparatus 900 is installed may be determined based on a direction and an intensity of the leakage magnetic field 913. An operation of determining the location and the angle at which the leakage magnetic field shielding apparatus 900 is installed based on the direction and the intensity of the leakage magnetic field 913 will be described below with reference to FIG. 12. Additionally, a plurality of leakage magnetic field shielding apparatuses 900 may be installed based on a number of targets to be shielded from the leakage magnetic field 913.

Figure 10:
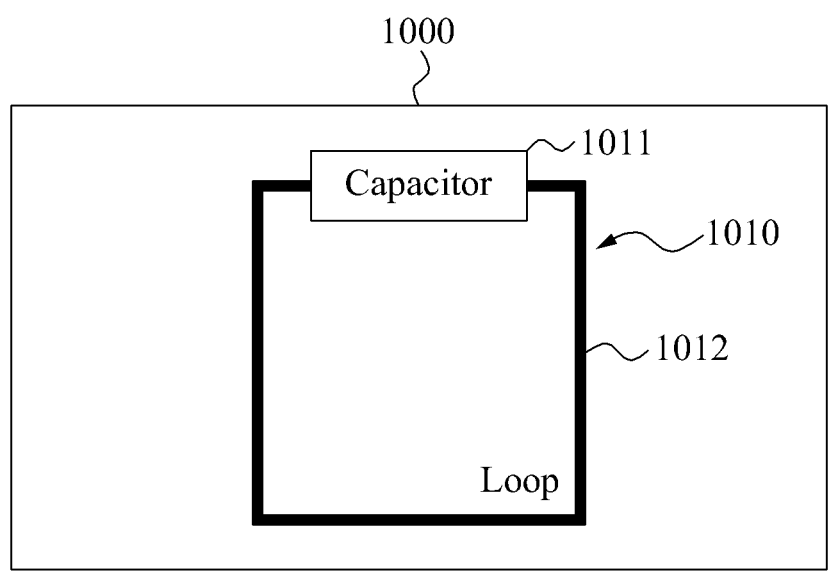
FIG. 10 is a diagram illustrating an example of a structure of a passive-type leakage magnetic field shielding apparatus.

FIG. 10 is a diagram illustrating an example of a structure of a passive-type leakage magnetic field shielding apparatus 1000. The passive-type leakage magnetic field shielding apparatus 1000 of FIG. 10 is configured to generate a counterbalance magnetic field in response to a leakage magnetic field without any external control.

Referring to FIG. 10, the passive-type leakage magnetic field shielding apparatus 1000 includes a resonator 1010 having a resonant frequency set to counterbalance a leakage magnetic field. The resonator 1010 includes a capacitor 1011 and a loop circuit 1012. When the resonator 1010 receives the leakage magnetic field, the resonator 1010 generates a counterbalance magnetic field at the resonant frequency set to counterbalance the leakage magnetic field.

In greater detail, the leakage magnetic field excites a current in the resonator 1010 having a magnitude and a phase that generates a counterbalance magnetic field at the resonant frequency set to counterbalance the leakage magnetic field having an intensity that is the same as an intensity of the leakage magnetic field, and a phase that is opposite to a phase of the leakage magnetic field.

A capacitance of the capacitor 1011 and an inductance of the loop circuit 1012 in the resonator 1010 are determined based on a magnitude and a phase of a leakage magnetic field at a location where the passive-type leakage magnetic field shielding apparatus 1000 is installed.

Additionally, a number of resonators 1010 included in the passive-type leakage magnetic field shielding apparatus 1000 may also be determined based on the intensity and the phase of the leakage magnetic field at the location where the passive-type leakage magnetic field shielding apparatus 1000 is installed. For example, it may be difficult to shield the leakage magnetic field with only one resonator 1010 at a location where the intensity of the leakage magnetic field is high, so a plurality of resonators 1010 may be provided.

The resonator 1010 may be any of various resonators known to one of ordinary skill in the art, for example, a meta-resonator, a spiral resonator, a helical resonator, or a loop resonator.

Figure 11:
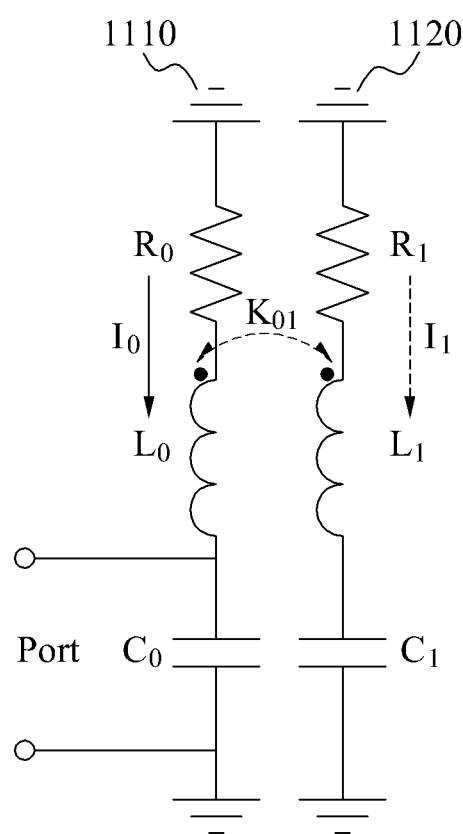
FIG. 11 is a diagram illustrating examples of equivalent circuits of a source resonator and a resonator of the leakage magnetic field shielding apparatus of FIG. 9.

FIG. 11 is a diagram illustrating examples of equivalent circuits of the source resonator 910 and a resonator of the leakage magnetic field shielding apparatus 900 of FIG. 9. The source resonator 910 may be modeled by an equivalent circuit 1110, and the resonator of the leakage magnetic field shielding apparatus 900 may be modeled by an equivalent circuit 1120. The equivalent circuit 1110 of the source resonator 910 is a series connection of a resistor having a resistance $R_0$, an inductor having an inductance $L_0$, and a capacitor having a capacitance $C_0$. The equivalent circuit 1120 of the resonator of the leakage magnetic field shielding apparatus 900 is a series connection of a resistor having a resistance $R_1$, an inductor having an inductance $L_1$, and a capacitor having a capacitance $C_1$. The inductor having the inductance $L_1$ is inductively coupled to the inductor having the inductance $L_0$. FIG. 11 shows a port connected to both ends of the capacitor having the capacitance $C_0$. This port is used to apply an RF signal having a resonant frequency of the source resonator 910 to the source resonator 910 and corresponds, for example, to the fifth conductor 381 and the sixth conductor 382 in FIG. 3B. A magnitude and a phase of a current $I_1$ flowing in the equivalent circuit 1120 of the resonator of the leakage magnetic field shielding apparatus 900 may be determined using the following Equation 5:

$$\frac{I_1}{I_0} = \frac{\sqrt{L_0/L_1}\, \kappa_{01}}{(f_1/f_0)^2 - 1} \quad (5)$$

In Equation 5, $I_0$ denotes a current flowing in the equivalent circuit 1110 of the source resonator 910, $f_0$ denotes a resonant frequency of the source resonator 910, $f_1$ denotes a resonant frequency of the resonator of the leakage magnetic field shielding apparatus 900, $L_0$ denotes an inductance of the source resonator 910, $L_1$ denotes an inductance of the resonator of the leakage magnetic field shielding apparatus 900, and $\kappa_{01}$ denotes a coupling coefficient of energy coupling between the source resonator 910 and the resonator of the leakage magnetic field shielding apparatus 900. The effect of $R_0$ and $R_1$ in FIG. 11 is negligible, so they are omitted from Equation 5. Also, $C_0$ and $C_1$ in FIG. 11 are indirectly included in Equation 5 because $f_0$ depends on $L_0$ and $C_0$, and $f_1$ depends on $L_1$ and $C_1$.

Using Equation 5, the magnitude and the phase of the current $I_1$ may be determined based on a magnitude and a phase of the current $I_0$, the resonant frequency $f_0$ and the inductance $L_0$ of the source resonator 910, and the resonant frequency $f_1$ and the inductance $L_1$ of the resonator in the leakage magnetic field shielding apparatus 900.

Figure 12:
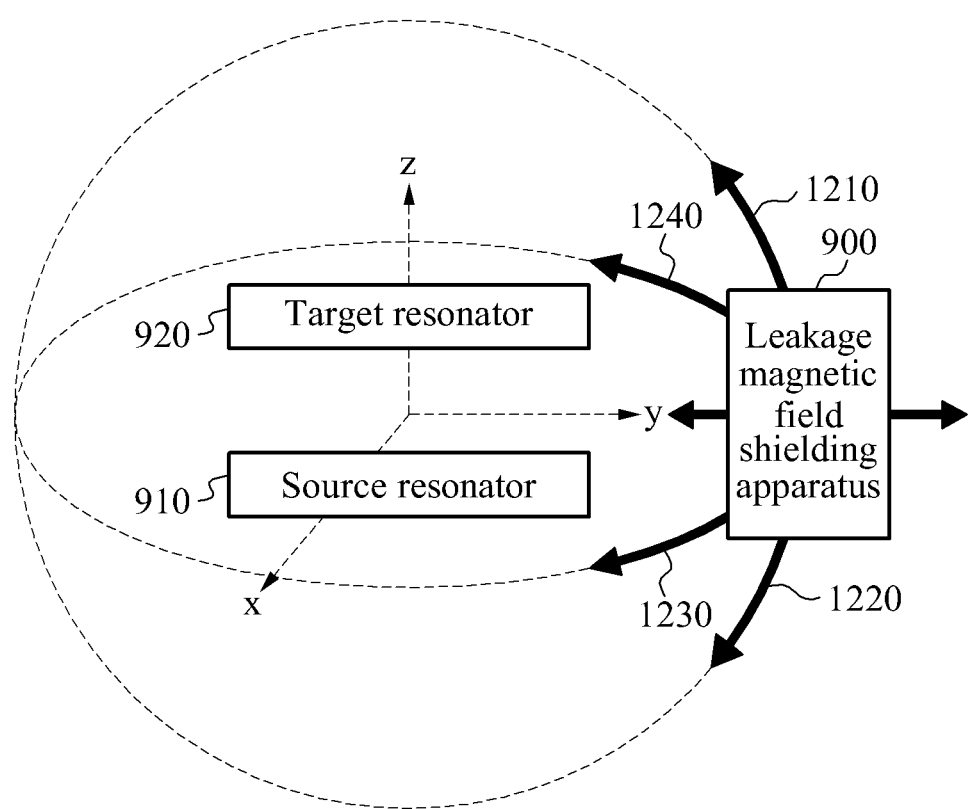
FIG. 12 is a diagram illustrating an example of locations where the leakage magnetic field shielding apparatus of FIG. 9 may be installed.

FIG. 12 is a diagram illustrating examples of locations where the leakage magnetic field shielding apparatus 900 of FIG. 9 may be installed. The leakage magnetic field shielding apparatus 900 may be installed above the target resonator 920, below the source resonator 910, in front of the source resonator 910, or behind the source resonator 910.

For example, a leakage magnetic field may be generated in all directions around the source resonator 910. In this example, the leakage magnetic field shielding apparatus 900 may be installed at a location on a surface of a sphere having a predetermined radius equal to a distance from the source resonator 910 to a location where the leakage magnetic field shielding apparatus 900 is installed.

In one example, the leakage magnetic field shielding apparatus 900 may be installed above the target resonator 920 along a curved line 1210 on the surface of the sphere, or may be installed below the source resonator 910 along a curved line 1220 on the surface of the sphere.

In another example, the leakage magnetic field shielding apparatus 900 may be installed in front of the source resonator 910 along a curved line 1230 on the surface of the sphere, or may be installed behind the source resonator 910 along a curved line 1240 on the surface of the sphere.

The leakage magnetic field shielding apparatus 900 is installed so that a unit of the leakage magnetic field shielding apparatus 900 configured to generate a counterbalance magnetic field faces toward the source resonator 910. In an example in which the leakage magnetic field shielding apparatus 900 is located in front of or behind the source resonator 910 as illustrated in FIG. 12, the leakage magnetic field shielding apparatus 900 is installed perpendicular to the ground so the unit configured to generate the counterbalance magnetic field faces toward the source resonator 910. In another example in which the leakage magnetic field shielding apparatus 900 is located above or below the source resonator 910 as illustrated in FIG. 12, the leakage magnetic field shielding apparatus 900 is installed parallel to the ground so the unit configured to generate the counterbalance magnetic field faces toward the source resonator 910.

In other words, an angle at which the leakage magnetic field shielding apparatus 900 is installed may be determined based on the location where the leakage magnetic field shielding apparatus 900 is installed, and an angle between the source resonator 910 and the leakage magnetic field shielding apparatus 900.

The leakage magnetic field shielding apparatus 900 may be installed at a location close to or far from the source resonator 910. In this example, a direction of a phase and an intensity of a leakage magnetic field to be counterbalanced by the leakage magnetic field shielding apparatus 900 will vary depending on a distance between the source resonator 910 and the leakage magnetic field shielding apparatus 900.

For example, when a distance between the source resonator 910 and a newly installed leakage magnetic field shielding apparatus is different from a distance between the source resonator 910 and a leakage magnetic field shielding apparatus 900 that has already been installed, a user may additionally determine an inductance and a capacitance of a resonator to be used to counterbalance a leakage magnetic field based on the distance between the source resonator 910 and the newly installed leakage magnetic field shielding apparatus. In this example, the newly installed leakage magnetic field shielding apparatus includes a resonator having the additionally determined inductance and capacitance. Alternatively, the user may additionally determine a resonant frequency to be used to counterbalance the leakage magnetic field based on the distance between the source resonator 910 and the newly installed leakage magnetic field shielding apparatus, and the newly installed leakage magnetic field shielding apparatus may include a resonator having the additionally determined resonant frequency. Alternatively, the user may additionally determine a size of the newly installed leakage magnetic field shielding apparatus based on the distance between the source resonator 910 and the newly installed leakage magnetic field shielding apparatus, and the newly installed leakage magnetic field shielding apparatus may have the additionally determined size and a resonator having a fixed frequency.

Figure 13:
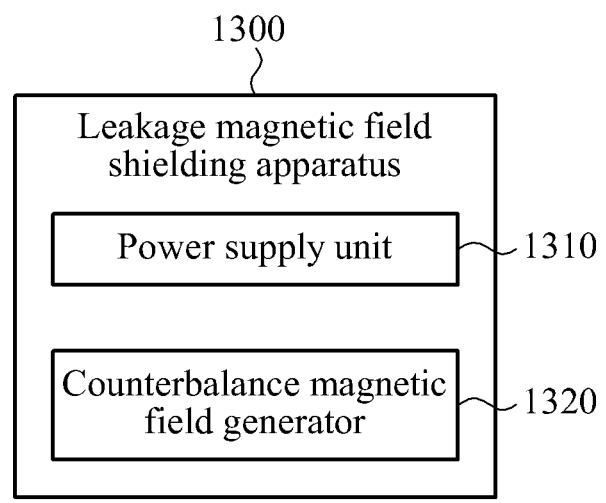
FIG. 13 is a diagram illustrating an example of an active-type leakage magnetic field shielding apparatus.

FIG. 13 is a diagram illustrating an example of an active-type leakage magnetic field shielding apparatus 1300. The active-type leakage magnetic field shielding apparatus 1300 of FIG. 13 may be configured to generate a counterbalance magnetic field when power is supplied under external control. Referring to FIG. 13, the active-type leakage magnetic field shielding apparatus 1300 includes a power supply unit 1310 and a counterbalance magnetic field generator 1320. The counterbalance magnetic field generator 1320 may include a loop circuit.

The power supply unit 1310 supplies power used to generate a counterbalance magnetic field to counterbalance a leakage magnetic field generated when a source resonator and a target resonator resonate at a resonant frequency. The power supply unit 1310 may be, for example, a power source configured to receive a power supply from an external source, or to supply power using a built-in battery.

Additionally, the power supply unit 1310 may include the power source and a capacitor configured to generate power in response to a leakage magnetic field in conjunction with the counterbalance magnetic field generator 1320, for example, in conjunction with a loop circuit of the counterbalance magnetic field generator 1320. In this example, the power supply unit 1310 combines the power supplied by the source with the power generated by the capacitor, and supplies the combined power to the counterbalance magnetic field generator 1320. For example, when an amount of power that can be supplied by the source is less than an amount of power needed to generate a counterbalance magnetic field to counterbalance a leakage magnetic field, the power supply unit 1310 combines the power generated by the capacitor with the power supplied by the source, and supplies the combined power to the counterbalance magnetic field generator 1320 to generate a counterbalance magnetic field at a resonant frequency set to counterbalance the leakage magnetic field.

The power supply unit 1310 controls a magnitude and a phase of the supplied power based on an intensity and a phase of the leakage magnetic field. For example, the power supplied by the power supply unit 1310 may produce a current in the counterbalance magnetic field generator 1320 having a magnitude and a phase that are identical to the magnitude and the phase of the current excited in the resonator 1010 in FIG. 10 by the leakage magnetic field.

The counterbalance magnetic field generator 1320 uses the power supplied by the power supply unit 1310 to generate a counterbalance magnetic field at a resonant frequency set to counterbalance the leakage magnetic field having an intensity that is the same as an intensity of the leakage magnetic field, and a phase that is opposite to a phase of the leakage magnetic field.

The active-type leakage magnetic field shielding apparatus 1300 may have a structure of a resonator. An example in which the active-type leakage magnetic field shielding apparatus 1300 has a structure of a resonator will now be described with reference to FIG. 14.

Figure 14:
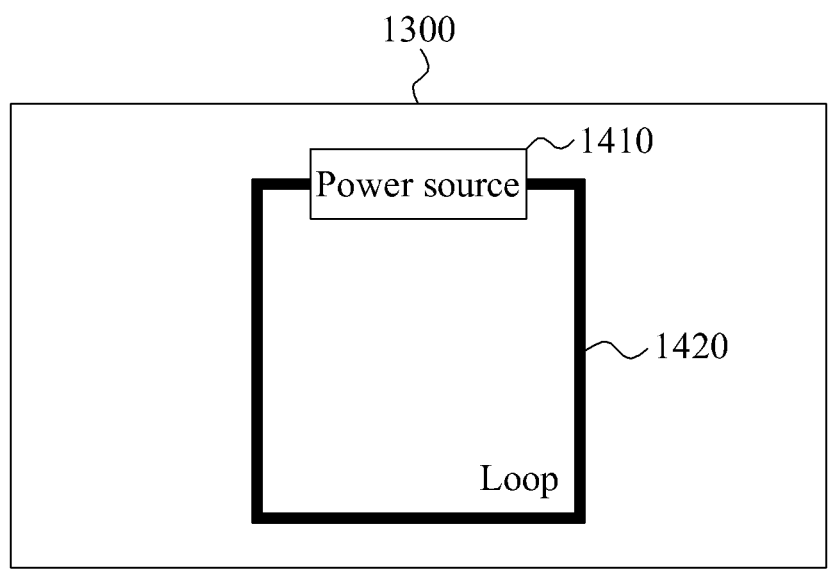
FIG. 14 is a diagram illustrating an example of a structure of the active-type leakage magnetic field shielding apparatus of FIG. 13.

FIG. 14 is a diagram illustrating an example of a structure of the active-type leakage magnetic field shielding apparatus 1300 of FIG. 13. As illustrated in FIG. 14, the active-type leakage magnetic field shielding apparatus 1300 has a structure in which the capacitor 1011 of FIG. 10 is replaced with a power source 1410. The power source 1410 supplies power, and a loop circuit 1420 of FIG. 14 corresponding to the loop circuit 1012 of FIG. 10 generates a counterbalance magnetic field using the power supplied by the power source 1410 at a resonant frequency set to counterbalance a leakage magnetic field generated by a source resonator.

The active-type leakage magnetic field shielding apparatus 1300 may have a structure of any of various resonators known to one of ordinary skill in the art, for example, a meta-resonator, a spiral resonator, a helical resonator, or a loop resonator.

Figure 15:
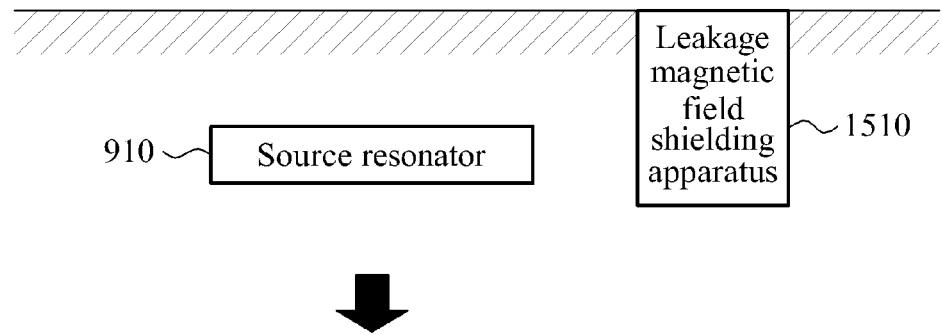
FIG. 15 is a diagram illustrating an example in which a leakage magnetic field shielding apparatus is moved depending on whether the leakage magnetic field is generating a counterbalance magnetic field.
Figure 15:
Figure 15:
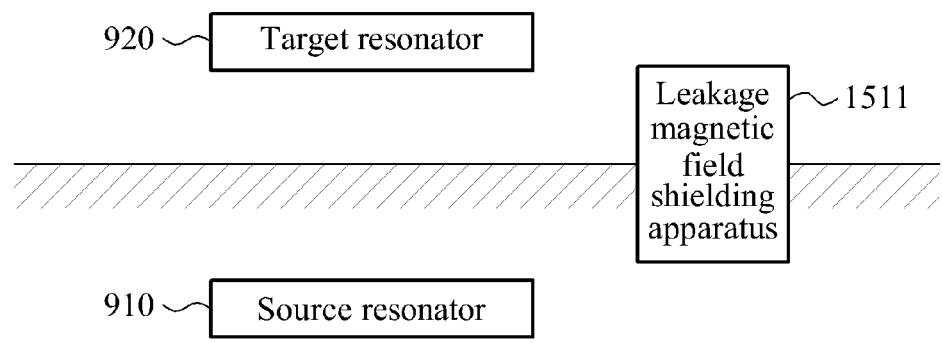

FIG. 15 is a diagram illustrating an example in which a leakage magnetic field shielding apparatus is moved depending on whether the leakage magnetic field is generating a counterbalance magnetic field. A leakage magnetic field shielding apparatus 1510 of FIG. 15 is configured to generate a counterbalance magnetic field to counterbalance a leakage magnetic field. When a leakage magnetic field is not generated, the leakage magnetic field shielding apparatus 1510 does not operate.

In a case 1 of FIG. 15 in which the target resonator 920 is not located near the source resonator 910, the leakage magnetic field shielding apparatus 1510 is located below ground level and does not generate a counterbalance magnetic field. For example, when there a vehicle is not being charged in an electric vehicle charging system using a wireless power transmission system, the leakage magnetic field shielding apparatus 1510 is located below ground level.

In a case 2 of FIG. 15 in which the target resonator 920 is located near the source resonator 910 and wirelessly receives power from the source resonator 910, a leakage magnetic field shielding apparatus 1511 is moved above ground level and generates a counterbalance magnetic field. For example, when a vehicle is being charged in an electric vehicle charging system using a wireless power transmission system, the leakage magnetic field shielding apparatus 1511 is moved above ground level to counterbalance a leakage magnetic field generated during charging of the vehicle.

Figure 16:
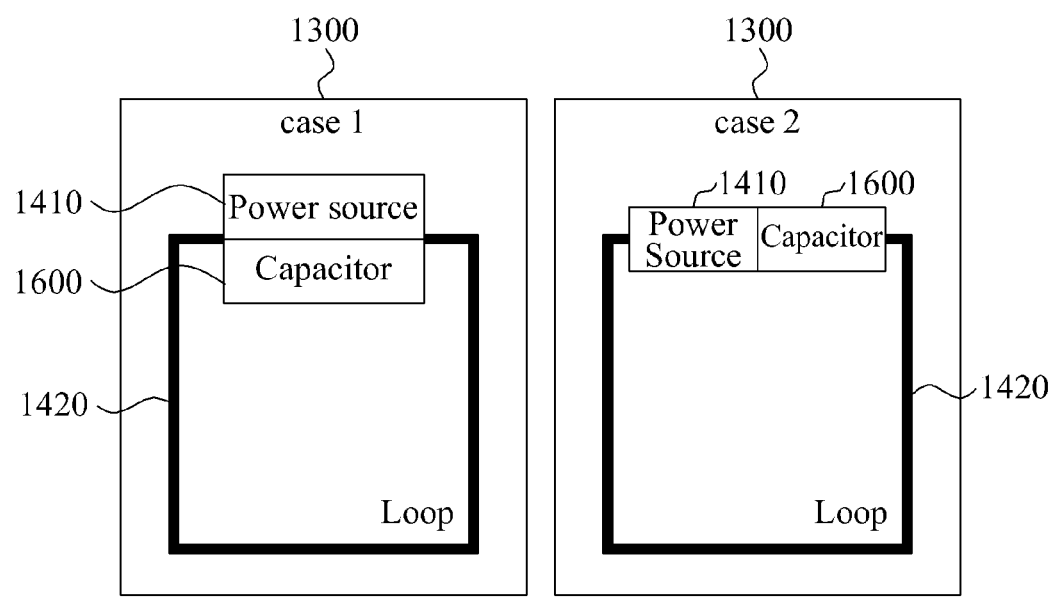
FIG. 16 is a diagram illustrating another example of a structure of the active-type leakage magnetic field shielding apparatus 1300 of FIG. 13.

FIG. 16 is a diagram illustrating another example of a structure of the active-type leakage magnetic field shielding apparatus 1300 of FIG. 13. As illustrated in FIG. 16, the active-type leakage magnetic field shielding apparatus 1300 further includes a capacitor 1600 configured to generate power in response to a leakage magnetic field in conjunction with the loop circuit 1420. The loop circuit 1420 generates a counterbalance magnetic field using the power generated by the capacitor 1600 and power supplied by the power source 1410. For example, when an amount of power that can be supplied by the power source 1410 is less than an amount of power needed to generate a counterbalance magnetic field to counterbalance a leakage magnetic field, the active-type leakage magnetic field shielding apparatus 1300 combines the power generated by the capacitor 1600 with the power supplied by the power source 1410, and supplies the combined power to the counterbalance magnetic field generator 1320 to generate the counterbalance magnetic field to counterbalance a leakage magnetic field.

The capacitor 1600 corresponds to the capacitor 1011 of the resonator 1010 of the passive-type leakage magnetic field shielding apparatus 1000 of FIG. 10. The power generated by the capacitor 1600 is equal to a difference between the power supplied by the power source 1410 and the power needed to generate a counterbalance magnetic field to counterbalance a leakage magnetic field. A capacitance of the capacitor 1600 and an inductance of the loop circuit 1420 are selected to cause a resonator formed by the capacitor 1600 and the loop circuit 1420 to have a resonant frequency set to counterbalance the leakage magnetic field.

In the active-type leakage magnetic field shielding apparatus 1300 of a case 1 of FIG. 16, the capacitor 1600 and the power source 1410 are connected in parallel. In the active-type leakage magnetic field shielding apparatus 1300 of a case 2 of FIG. 16, the capacitor 1600 and the power source 1410 are connected in series.

Figure 17:
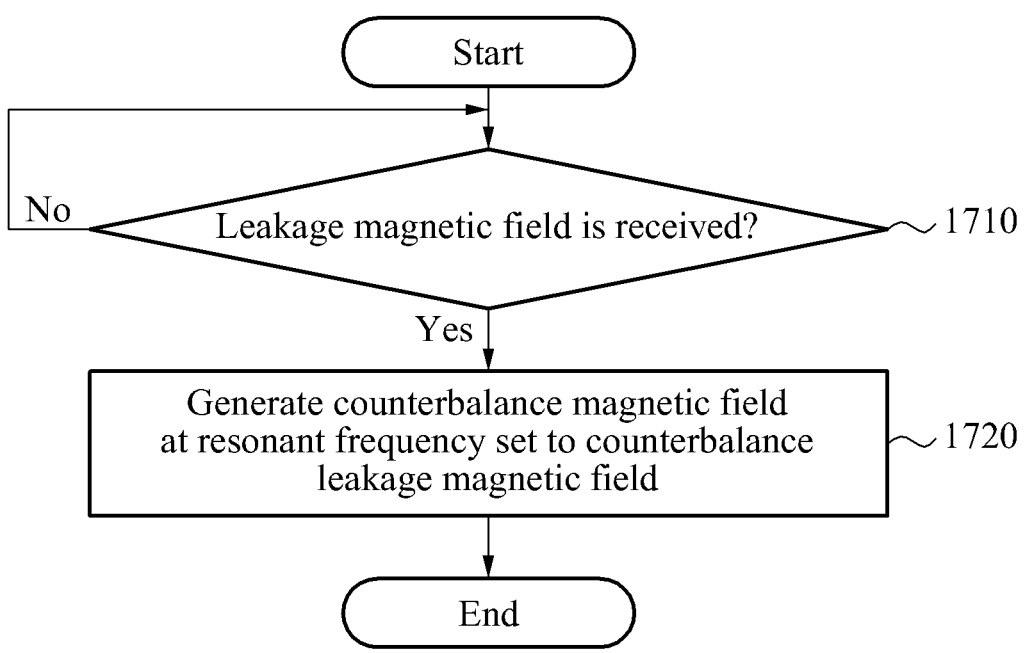
FIG. 17 is a flowchart illustrating an example of a passive-type leakage magnetic field shielding method.

FIG. 17 is a flowchart illustrating an example of a passive-type leakage magnetic field shielding method. The passive-type leakage magnetic field shielding method of FIG. 17 may be performed by the passive-type leakage magnetic field shielding apparatus 1000 of FIG. 10.

In 1710, the resonator 1010 of FIG. 10 passively monitors whether the resonator 1010 receives a leakage magnetic field. The leakage magnetic field may be generated when a source resonator and a target resonator resonate at a resonant frequency of the target resonator and the source resonator. If the resonator 1010 does not receive the leakage magnetic field in 1710, the resonator 1010 does not generate a counterbalance magnetic field at a resonant frequency set to counterbalance the leakage magnetic field, and continues to passively monitor whether a leakage magnetic field is present.

If the resonator 1010 receives the leakage magnetic field in 1710, in 1720 the resonator 1010 generates the counterbalance magnetic field at the resonant frequency set to counterbalance the leakage magnetic field in response to the leakage magnetic field. That is, the leakage magnetic field causes the resonator 1010 to generate the counterbalance magnetic field.

In greater detail, in 1720, the leakage magnetic field excites a current in the resonator 1010 having a magnitude and a phase that generates a counterbalance magnetic field at the resonant frequency set to counterbalance the leakage magnetic field having an intensity that is the same as an intensity of the leakage magnetic field, and a phase that is opposite to a phase of the leakage magnetic field.

Figure 18:
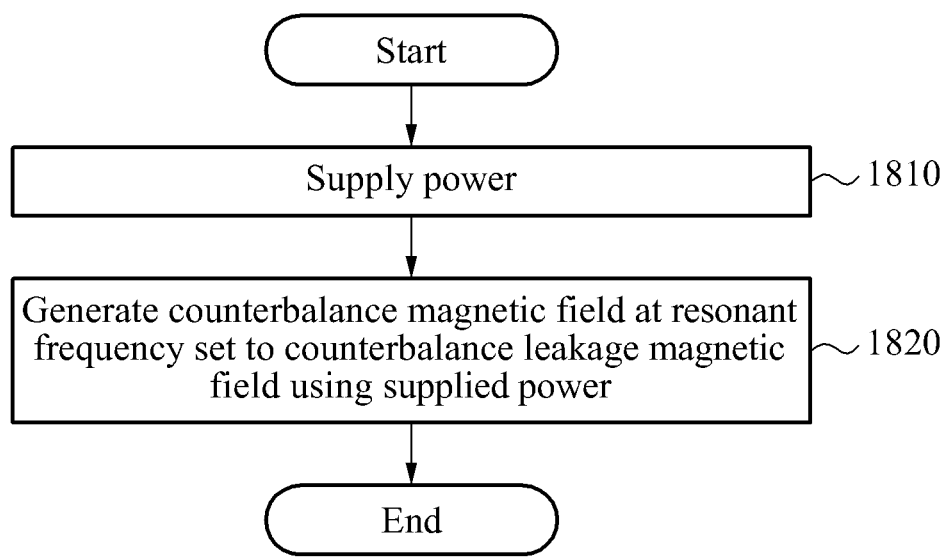
FIG. 18 is a flowchart illustrating an example of an active-type leakage magnetic field shielding method.

FIG. 18 is a flowchart illustrating an example of an active-type leakage magnetic field shielding method. The active-type leakage magnetic field shielding method of FIG. 18 may be performed by the active-type leakage magnetic field shielding apparatus 1300 of FIG. 13.

In 1810, the power supply unit 1310 supplies power to be used to generate a counterbalance magnetic field to counterbalance a leakage magnetic field generated when a source resonator and a target resonator resonate at a resonant frequency. The power supply unit 1310 controls a magnitude and a phase of the supplied power based on an intensity and a phase of the leakage magnetic field.

In 1820, the counterbalance magnetic field generator 1320 generates a counterbalance magnetic field at a resonant frequency set to counterbalance the leakage magnetic field using the power supplied in 1810.

The controller 114, the communication unit 115, the communication unit 124, the controller 125 the communication/tracking unit 811, the micro control unit (MCU), and the communication/tracking unit 823 described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A leakage magnetic field shielding apparatus comprising:
   a resonator configured to counterbalance a leakage magnetic field generated when a source resonator and a target resonator resonate at a resonant frequency of the source resonator and the target resonator.

2. The leakage magnetic field shielding apparatus of claim 1, wherein the leakage magnetic field causes the resonator to generate a counterbalance magnetic field at a resonant frequency set to counterbalance the leakage magnetic field.

3. The leakage magnetic field shielding apparatus of claim 1, wherein the leakage magnetic field excites a current in the resonator;
   the current in the resonator generates a counterbalance magnetic field at a resonant frequency set to counterbalance the leakage magnetic field; and
   the counterbalance magnetic field has an intensity that is equal to an intensity of the leakage magnetic field.

4. The leakage magnetic field shielding apparatus of claim 1, wherein the leakage magnetic field excites a current in the resonator;
   the current in the resonator generates a counterbalance magnetic field at a resonant frequency set to counterbalance the leakage magnetic field; and
   the counterbalance magnetic field has a phase that is opposite to a phase of the leakage magnetic field.

5. The leakage magnetic field shielding apparatus of claim 1, wherein the resonator comprises a loop circuit configured to generate a counterbalance magnetic field having an intensity that is equal to an intensity of the leakage magnetic field, and a phase that is opposite to a phase of the leakage magnetic field.

6. The leakage magnetic field shielding apparatus of claim 1, further comprising at least one additional resonator configured to counterbalance the leakage magnetic field generated when the source resonator and the target resonator resonate at the resonant frequency;
   wherein a total number of resonators of the leakage magnetic shielding apparatus depends on an intensity and a phase of the leakage magnetic field.

7. A leakage magnetic field shielding apparatus comprising:
   a power supply unit configured to supply power to be used to counterbalance a leakage magnetic field generated when a source resonator and a target resonator resonate at a resonant frequency of the source resonator and the target resonator; and
   a counterbalance magnetic field generator configured to generate a counterbalance magnetic field at a resonant frequency set to counterbalance the leakage magnetic field using the power supplied by the power supply unit.

8. The leakage magnetic field shielding apparatus of claim 7, wherein the power supply unit is further configured to control a magnitude of the power supplied by the power supply unit based on an intensity of the leakage magnetic field.

9. The leakage magnetic field shielding apparatus of claim 7, wherein the power supply unit is further configured to control a phase of the power supplied by the power supply unit based on a phase of the leakage magnetic field.

10. The leakage magnetic field shielding apparatus of claim 7, wherein the power supply unit comprises:
    a power source configured to supply power; and
    a capacitor configured to generate power in response to the leakage magnetic field.

11. A wireless power transmission system comprising:
    a source resonator configured to generate a power transmission magnetic field and a leakage magnetic field at a resonant frequency of the source resonator;
    a target resonator configured to generate power in response to the power transmission magnetic field, the target resonator having a resonant frequency that is equal to the resonant frequency of the source resonator; and
    a leakage magnetic field shielding apparatus configured to generate a counterbalance magnetic field to counterbalance the leakage magnetic field.

12. The wireless power transmission system of claim 11, wherein the leakage magnetic field shielding apparatus comprises a resonator configured to generate the counterbalance magnetic field at a resonant frequency set to counterbalance the leakage magnetic field in response to the leakage magnetic field.

13. The wireless power transmission system of claim 12, wherein the leakage magnetic field causes the resonator to generate the counterbalance magnetic field at the resonant frequency set to counterbalance the leakage magnetic field.

14. The wireless power transmission system of claim 11, wherein the leakage magnetic field shielding apparatus comprises:
a power supply unit configured to supply power to be used to counterbalance the leakage magnetic field; and
a counterbalance magnetic field generator configured to generate the counterbalance magnetic field at a resonant frequency set to counterbalance the leakage magnetic field using the power supplied by the power supply unit.

15. The wireless power transmission system of claim 11, wherein a location and an angle at which the leakage magnetic field shielding apparatus is installed are determined based on an intensity and a direction of the leakage magnetic field.

16. A leakage magnetic field shielding method comprising:
generating a counterbalance magnetic field to counterbalance a leakage magnetic field generated when a source resonator and a target resonator resonate at a resonant frequency of the source resonator and the target resonator.

17. The leakage magnetic field shielding method of claim 16, wherein the generating comprises generating the counterbalance magnetic field with a resonator having a resonant frequency set to counterbalance the leakage magnetic field;
the leakage magnetic field excites a current in the resonator; and
the current in the resonator generates the counterbalance magnetic field at the resonant frequency set to counterbalance the leakage magnetic field so that an intensity of the counterbalance magnetic field is equal to an intensity of the leakage magnetic field.

18. The leakage magnetic field shielding method of claim 16, wherein the generating comprises generating the counterbalance magnetic field with a resonator having a resonant frequency set to counterbalance the leakage magnetic field;
the leakage magnetic field excites a current in the resonator; and
the current in the resonator generates the counterbalance magnetic field at the resonant frequency set to counterbalance the leakage magnetic field so that a phase of the counterbalance magnetic field is opposite to a phase of the leakage magnetic field.

19. A leakage magnetic field shielding method comprising:
supplying power to be used to counterbalance a leakage magnetic field generated when a source resonator and a target resonator resonate at a resonant frequency of the source resonator and the target resonator; and
generating a counterbalance magnetic field at a resonant frequency set to counterbalance the leakage magnetic field using the supplied power.

20. The leakage magnetic field shielding method of claim 19, wherein the supplying comprises controlling a magnitude of the supplied power based on an intensity of the leakage magnetic field.

21. The leakage magnetic field shielding method of claim 19, wherein the supplying comprises controlling a phase of the supplied power based on a phase of the leakage magnetic field.

22. A leakage magnetic field shielding apparatus comprising:
a device configured to generate a counterbalance magnetic field to counterbalance a leakage magnetic field generated during wireless power transmission.

23. The leakage magnetic field shielding apparatus of claim 22, wherein the leakage magnetic field is generated when a source resonator resonates with a target resonator at a resonant frequency of the source resonator and the target resonator to wirelessly transmit power from the source resonator to the target resonator; and
the device comprises a resonator configured to generate the counterbalance magnetic field at a resonant frequency set to counterbalance the leakage magnetic field.

24. The leakage magnetic field shielding apparatus of claim 23, wherein the resonator comprises:
a capacitor; and
a loop circuit connected to the capacitor;
the leakage magnetic field excites a current in the resonator at the resonant frequency set to counterbalance the leakage magnetic field; and
the current in the resonator generates the counterbalance magnetic field at the resonant frequency set to counterbalance the leakage magnetic field.

25. The leakage magnetic field shielding apparatus of claim 24, wherein a capacitance of the capacitor and an inductance of the loop circuit have values that cause the current in the resonator to have a magnitude and a phase that cause the counterbalance magnetic field to have an intensity that is equal to an intensity of the leakage magnetic field, and a phase that is opposite to a phase of the leakage magnetic field, so that the counterbalance magnetic field counterbalances the leakage magnetic field.

26. The leakage magnetic field shielding apparatus of claim 23, wherein the resonator comprises:
a power supply unit configured to supply power; and
a loop circuit connected to the power supply and configured to generate the counterbalance magnetic field at the resonant frequency set to counterbalance the leakage magnetic field using the power supplied by the power supply unit.

27. The leakage magnetic field shielding apparatus of claim 26, wherein the power supply is further configured to control a magnitude and a phase of the power supplied by the power supply unit so that the counterbalance magnetic field generated by the loop circuit using the power supplied by the power supply unit has an intensity that is equal to an intensity of the leakage magnetic field, and a phase that is opposite to a phase of the leakage magnetic field, so that the counterbalance magnetic field counterbalances the leakage magnetic field.

* * * * *